US011122606B2

(12) United States Patent
Quan et al.

(10) Patent No.: US 11,122,606 B2
(45) Date of Patent: Sep. 14, 2021

(54) TERMINAL, BASE STATION, AND SCHEDULING REQUEST TRANSMISSION METHOD

(71) Applicant: Huawei Technologies Co., Ltd., Shenzhen (CN)

(72) Inventors: Wei Quan, Beijing (CN); Bingzhao Li, Beijing (CN); Xiaodong Yang, Shenzhen (CN); Jian Zhang, Beijing (CN); Jinhua Miao, Beijing (CN); Bin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/812,544

(22) Filed: Nov. 14, 2017

(65) Prior Publication Data
US 2018/0070378 A1 Mar. 8, 2018

Related U.S. Application Data

(63) Continuation of application No. PCT/CN2015/079066, filed on May 15, 2015.

(51) Int. Cl.
*H04W 72/12* (2009.01)
*H04W 88/06* (2009.01)
*H04W 72/04* (2009.01)

(52) U.S. Cl.
CPC ....... *H04W 72/1284* (2013.01); *H04W 72/12* (2013.01); *H04W 72/1205* (2013.01); *H04W 88/06* (2013.01); *H04W 72/0446* (2013.01)

(58) Field of Classification Search
CPC ......... H04W 72/1284; H04W 72/1205; H04W 72/12; H04W 88/06; H04W 72/0446
See application file for complete search history.

(56) References Cited

U.S. PATENT DOCUMENTS 8,634,312 B2  1/2014 Chun et al.
8,767,775 B2  7/2014 Lee et al.
(Continued)

FOREIGN PATENT DOCUMENTS

CN  101400150 A  4/2009
CN  101426271 A  5/2009
(Continued)

OTHER PUBLICATIONS

LEE et al. "Configuration of RACH in Short TII, CB-PUSCH and CB-SR," U.S. Appl. No. 62/154,732, filed Apr. 30, 2015 (Year: 2015).*

(Continued)

*Primary Examiner* — Thinh D Tran
(74) *Attorney, Agent, or Firm* — Slater Matsil, LLP

(57) ABSTRACT

The present invention relates to a scheduling request transmission method, so as to effectively transmit a scheduling request when scheduling request resources are configured on multiple carriers. The terminal receives a configuration parameter for a scheduling request from a base station; when the scheduling request is triggered, the terminal sends the scheduling request on a selected one carrier of multiple carriers according to the configuration parameter. Scheduling request resources are assigned to the terminal on multiple carriers by sending the configuration parameter, so that the terminal can send the scheduling request on the selected one carrier of the multiple carriers according to the configuration parameter. This provides a solution to effectively transmitting the scheduling request.

14 Claims, 7 Drawing Sheets

| Reserved field | Reserved field | Extension field | Logical channel identifier field | Octet 1 |
|---|---|---|---|---|
| Length indication field | Length field || | Octet 2 |
| Length field ||| | Octet 3 |

Reserved field/Reserved field/Extension field/Logical channel identifier field/Length indication field/Length field Header information (the length field is 15 bits)

(56) References Cited

U.S. PATENT DOCUMENTS

| | | | |
|---|---|---|---|
| 8,929,354 B2 | 1/2015 | Pettersson | |
| 9,019,983 B2 | 4/2015 | Maeda et al. | |
| 2009/0109917 A1 | 4/2009 | Pajukoski et al. | |
| 2009/0163211 A1 | 6/2009 | Kitazoe et al. | |
| 2010/0046460 A1 | 2/2010 | Kwak et al. | |
| 2011/0003555 A1* | 1/2011 | Guo | H04L 5/001 455/67.11 |
| 2011/0134774 A1 | 6/2011 | Pelletier et al. | |
| 2012/0100864 A1* | 4/2012 | Susitaival | H04L 1/188 455/450 |
| 2012/0113914 A1 | 5/2012 | Zhao et al. | |
| 2013/0044698 A1 | 2/2013 | Susitaival et al. | |
| 2013/0258958 A1 | 10/2013 | Dinan | |
| 2013/0272241 A1* | 10/2013 | Ohta | H04W 74/006 370/329 |
| 2013/0301611 A1* | 11/2013 | Baghel | H04W 72/04 370/331 |
| 2013/0322383 A1* | 12/2013 | Dinan | H04W 52/281 370/329 |
| 2014/0161086 A1 | 6/2014 | Tamura et al. | |
| 2015/0078286 A1* | 3/2015 | Kim | H04L 1/18 370/329 |
| 2015/0117342 A1 | 4/2015 | Loehr et al. | |
| 2015/0146701 A1 | 5/2015 | Futaki | |
| 2015/0305016 A1* | 10/2015 | Dai | H04L 5/0053 370/280 |
| 2016/0112181 A1* | 4/2016 | Tabet | H04W 72/0413 370/296 |
| 2016/0270107 A1* | 9/2016 | Dinan | H04L 5/001 |
| 2018/0070378 A1 | 3/2018 | Quan et al. | |
| 2018/0092118 A1* | 3/2018 | Kim | H04W 28/0278 |
| 2018/0124829 A1* | 5/2018 | Lee | H04L 5/00 |

FOREIGN PATENT DOCUMENTS

| | | |
|---|---|---|
| CN | 102111393 A | 6/2011 |
| CN | 102821477 A | 12/2012 |
| CN | 103460751 A | 12/2013 |
| EP | 2661138 A1 | 11/2013 |
| JP | 2015111947 A | 6/2015 |
| JP | 2015519821 A | 7/2015 |
| RU | 2426236 C2 | 8/2011 |
| RU | 2450460 C2 | 5/2012 |
| RU | 2523189 C2 | 7/2014 |
| RU | 2685023 C1 | 4/2019 |
| WO | 2011012040 A1 | 2/2011 |
| WO | 2013018291 A1 | 2/2013 |
| WO | 2013023959 A1 | 2/2013 |
| WO | 2013164105 A1 | 11/2013 |
| WO | 2013179590 A1 | 12/2013 |
| WO | 2015020501 A1 | 2/2015 |

OTHER PUBLICATIONS

Kunmin Yeo, Youngil Kim and Won Ryu, "A hybrid timer-based scheduling request scheme for packetized mobile communications," 2012 7th International Conference on Computing and Convergence Technology (ICCCT), Seoul, 2012, pp. 840-844. (Year: 2012).*

Huawei, et al., "Further discussion on extension of L field in MAC PDU", 3GPP TSG-RAN WG2 Meeting #91 bis, Malmo, Sweden, Oct. 5-9, 2015, R2-154342, 7 pages. (Year: 2015).*

3GPP TS 36.321 V12.0.0 (Dec. 2013), 3rd Generation Partnership Project; Technical Specification Group Radio Access Network; Evolved Universal Terrestrial Radio Access (E-UTRA); Medium Access Control (MAC) protocol specification (Release 12), total 57 pages.

Mediatek Inc., "Remaining issues for PUCCH on SCell", 3GPP TSG-RAN2 #89bis Meeting, R2-151252, Bratislava, Slovakia, Apr. 20-24, 2015, 4 pages.

3GPP TSG-RAN WG2 Meeting #89bis R2-151211,"LTE_CA_enh_b5C-Core / Release 13", Nokia Networks, Apr. 20-24, 2015, 3 pages, Bratislava, Slovakia.

3rd Generation Partnership Project; Technical Specification Group Radio Access Network; Evolved Universal Terrestrial Radio Access (E-UTRA); Medium Access Control (MAC) protocol specification (Release 12), 3GPP TS 36.321 V12.5.0 (Mar. 2015), 77 pages.

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.5.0 (Mar. 2015), 445 pages.

3GPP TSG-RAN WG2 Meeting #69bis R2-101987,"Semi-Persistent Scheduling in Carrier Aggregation", Nokia Siemens Networks, Nokia Corporation, Apr. 12-16, 2010, 2 pages, Beijing, China.

3GPP TSG-RAN WG2 Meeting #87 R2-143309,"Motivation of SPS support in small cell", CMCC, Nokia Networks, ZTE, CATT,18. 8. to 22.8.2014, 3 pages, Dresden, Germany.

3GPP TSG-RAN WG2 Meeting #87 R2-143808 (Revision of R2-143347),"Report and summary of email discussion [86#29][LTE/DC] RRM measurements", Huawei, Aug. 18-22, 2014, 34 pages, Dresden, Germany.

3GPP TSG-RAN WG2 Meeting #89 R2-150372,"Introduce PUCCH on SCell for CA beyond 5 carriers", Huawei, HiSilicon, Feb. 9-13, 2015, 8 pages, Athens, Greece.

3GPP TSG-RAN WG2 Meeting #89bis R2-151324,"Leftover issues for PUCCH on SCell", Huawei, HiSilicon, Apr. 20-24, 2015, 3 pages, Bratislava, Slovakia.

Sharetechnote, URL:https://web.archive.org/web/20150423212355/http://www.sharetechnote.com/html/MAC_LTE.html, Published on Apr. 23, 2015, 17 pages.

Ericsson, "Limitation of Sequence Numbers and Length Fields for high Category UE support", 3GPP TSG-RAN WG2 #87bis, Shanghai, China, Oct. 6-10, 2014, R2-144472, 4 pages.

Ericsson, et al., "Limitation of Sequence Numbers and Length Fields in LTE Rel-10", 3GPP TSG-RAN WG2 #73, Taipei, Taiwan, Feb. 21-25, 2011, R2-111352, 4 pages.

HTC, Clarification on TTI bundling, 3GPP TSG-RAN2 Meeting #89, R2-150408, Athens, Greece, Feb. 13, 2015, total 6 pages.

NEC, "SR on PUCCH SCell", 3GPP TSG RAN WG2 Meeting #89b, R2-151430, Bratislava, Slovakia, Apr. 20-24, 2015, total 5 pages.

Huawei, et al., "Further discussion on extension of L field in MAC PDU", 3GPP TSG-RAN WG2 Meeting #91bis, Malmo, Sweden, Oct. 5-9, 2015, R2-154342, 7 pages.

Ericsson, "Open issues on L2 UP headers extension", 3GPP TSG-RAN WG2 #91bis, Malmo, Sweden, Oct. 5-9, 2015, Tdoc R2-154673, 3 pages.

* cited by examiner

Reserved field/Reserved field/Extension field/Logical channel identifier field/
Length indication field/Length field Header information (the length field is 7 bits)

| Reserved field | Reserved field | Extension field | Logical channel identifier field | Octet 1 |
| --- | --- | --- | --- | --- |
| Length indication field | Length field ||| Octet 2 |
| Length field |||| Octet 3 |

Reserved field/Reserved field/Extension field/Logical channel identifier field/Length indication field/Length field Header information (the length field is 15 bits)

FIG. 9B

| Reserved field | Second length indication field | Extension field | Logical channel identifier field | Octet 1 |
| --- | --- | --- | --- | --- |
| Length indication field | Length field ||| Octet 2 |
| Length field |||| Octet 3 |
| Length field |||| Octet 4 |

Reserved field/Length indication field/Extension field/Logical channel identifier field/Second length indication field/Length field Header information (the length field is 23 bits)

FIG. 10A

Reserved field/Length indication field/Extension field/Logical channel identifier field/Length field Header information (the length field is 16 bits)

Length indication field/Extension field/Logical channel identifier field/Length field Header information (the length field is 17 bits)

TERMINAL, BASE STATION, AND SCHEDULING REQUEST TRANSMISSION METHOD

CROSS-REFERENCE TO RELATED APPLICATIONS

This application is a continuation of an International Application No. PCT/CN2015/079066, filed on May 15, 2015, the disclosure of which is hereby incorporated by reference in its entirety.

TECHNICAL FIELD

The present application relates to the field of wireless communications technologies, and in particular, to a terminal, a base station, and a scheduling request transmission method.

BACKGROUND

In a wireless communications system, for example, in a Long Term Evolution (LTE) system, after a scheduling request (SR) is triggered, user equipment (UE) may send the SR to an evolved NodeB (eNB) to request the evolved NodeB to assign an uplink resource, which is used for uplink data transmission.

When sending the SR, the UE may use an SR resource configured by the eNB. The eNB may send a configuration parameter that is used to configure an SR resource, so as to indicate the UE an SR resource available to the UE, a period of the SR resource, a subframe offset, a maximum quantity of sending times, an SR prohibit timer, and the like.

In a single-carrier scenario, that is, the UE uses only one carrier to perform data transmission. In other words, only one carrier serves the UE. In a conventional multi-carrier scenario, that is, the UE uses multiple carriers to perform data transmission. In other words, multiple carriers serve the UE. The eNB configures, only on a primary carrier (for example, PCell, Primary Cell) of the UE, the SR resource available to the UE, instead of configuring, on a secondary carrier (for example, SCell, Secondary Cell), the SR resource of the UE.

In the multi-carrier enhancement technologies, the eNB may configure, on the secondary carrier, the SR resource available to the UE. Currently, there is no solution to effectively transmitting the SR when SR resources are configured on multiple carriers.

SUMMARY

In view of this, embodiments of the present application provide a terminal, a base station, and a scheduling request transmission method, so as to provide a solution to effectively transmitting an SR when SR resources are configured on multiple carriers.

According to a first aspect, an embodiment of the present application provides a terminal, including:

a transceiver module, configured to receive a configuration parameter, for a scheduling request, sent by a base station, where the configuration parameter is used to assign the terminal a scheduling request resource, used by the terminal to send the scheduling request, on at least one carrier serving the terminal; and a processing module, configured to: after the scheduling request is triggered, send, according to the configuration parameter received by the transceiver module, the scheduling request on one carrier of the at least one carrier by using the transceiver module, where the at least one carrier includes at least one secondary carrier and a primary carrier; or the at least one carrier includes at least one secondary carrier.

With reference to the first aspect, in a first possible implementation manner, the processing module is specifically configured to:

select one carrier from the at least one carrier; and send the scheduling request on the selected carrier according to a configuration parameter that is used to configure a scheduling request resource on the selected carrier and that is in the received configuration parameter.

With reference to the first aspect, in a second possible implementation manner, the processing module is specifically configured to:

select one carrier from the at least one carrier that has a valid scheduling request resource in a current transmission time interval TTI.

With reference to the second possible implementation manner of the first aspect, in a third possible implementation manner, the processing module is specifically configured to:

determine, from the at least one carrier, a candidate carrier that is used to send the scheduling request, and select, from the determined candidate carrier, a carrier that has a valid scheduling request resource in the current TTI, where the candidate carrier includes:

the at least one carrier; or an activated carrier in the at least one carrier.

With reference to the first possible implementation manner of the first aspect, in a fourth possible implementation manner, the processing module is specifically configured to:

select, from the at least one carrier, a carrier whose configured scheduling request resource is the closest to a current TTI in terms of time; and the processing module is further configured to: before sending the scheduling request on the selected carrier according to a configuration parameter that is used to configure a scheduling request resource on the selected carrier and that is in the received configuration parameter, when a TTI of the scheduling request resource of the selected carrier arrives, determine that the selected carrier has a valid scheduling request resource.

With reference to the first possible implementation manner of the first aspect, in a fifth possible implementation manner, the processing module is specifically configured to:

determine whether the at least one carrier has a valid scheduling request resource in a current TTI; and if the at least one carrier has a valid scheduling request resource in the current TTI, select one carrier from the determined carrier that has a valid scheduling request resource; or if the at least one carrier does not have a valid scheduling request resource in the current TTI, when a next TTI arrives, go back to the step of determining whether the at least one carrier has a valid scheduling request resource.

With reference to any one of the second to the fifth possible implementation manners of the first aspect, in a sixth possible implementation manner, a carrier that satisfies at least one of following conditions is a carrier that has a valid scheduling request resource, where the conditions include:

there is an unreleased scheduling request resource on a carrier;

a carrier is activated;

a timer of a timing advance group TAG in which a carrier is located does not time out; and a quantity of sending a scheduling request by the terminal on a carrier is less than a maximum value of a quantity of sending a scheduling request by the terminal on the carrier.

With reference to any one of the first aspect or the first to the sixth possible implementation manners of the first aspect, in a seventh possible implementation manner, the configuration parameter includes a threshold of a first counter;

the processing module is further configured to: after the transceiver module receives the configuration parameter, and before the processing module sends the scheduling request on one carrier of the at least one carrier according to the received configuration parameter by using the transceiver module, obtain the threshold of the first counter from the configuration parameter and determine whether the first counter is less than the threshold of the first counter, where the first counter is used to record a quantity of sending a scheduling request by the terminal in a same scheduling request process;

the processing module is specifically configured to: when the first counter is less than the threshold of the first counter, send the scheduling request on one carrier of the at least one carrier by using the transceiver module; and the processing module is further configured to: after the transceiver module sends the scheduling request on one carrier of the at least one carrier according to the received configuration parameter, increase a value of the first counter by one.

With reference to the seventh possible implementation manner of the first aspect, in an eighth possible implementation manner, the processing module is further configured to: after determining whether the first counter is less than the threshold of the first counter, when the first counter is not less than the threshold of the first counter, release physical uplink control channel resources and/or uplink reference signal resources that are of all secondary carriers in the at least one carrier; or release physical uplink control channel resources and/or uplink reference signal resources that are of carriers in physical uplink control channel groups in which all secondary carriers of the at least one carrier are located; or release physical uplink control channel resources and/or uplink reference signal resources that are of all serving carriers.

With reference to the eighth possible implementation manner of the first aspect, in a ninth possible implementation manner, the processing module is specifically configured to:

when the at least one carrier includes only a secondary carrier, release the physical uplink control channel resources and/or the uplink reference signal resources that are of all the secondary carriers in the at least one carrier.

With reference to the eighth possible implementation manner of the first aspect, in a tenth possible implementation manner, the processing module is specifically configured to:

when the at least one carrier includes only a secondary carrier, release the physical uplink control channel resources and/or the uplink reference signal resources that are of all the carriers in the physical uplink control channel groups in which all the secondary carriers of the at least one carrier are respectively located.

With reference to the eighth possible implementation manner of the first aspect, in an eleventh possible implementation manner, the processing module is specifically configured to:

when the at least one carrier includes only a secondary carrier and a primary carrier, release the physical uplink control channel resources on the uplink control channel and/or the uplink reference signal resources on the uplink control channel that are of all the serving carriers.

With reference to any one of the first aspect or the first to the eleventh possible implementation manners of the first aspect, in a twelfth possible implementation manner, the configuration parameter includes a threshold length of a first timer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process; and the processing module is further configured to: after sending the scheduling request on one carrier of the at least one carrier according to the received configuration parameter by using the transceiver module, start the first timer according to a threshold length of the first timer.

With reference to any one of the first aspect or the first to the eleventh possible implementation manners of the first aspect, in a thirteenth possible implementation manner, the configuration parameter includes n, a threshold length of a first timer is n times a period of a scheduling request resource available to the terminal on a specific carrier of the at least one carrier, and n is a positive integer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process;

when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum; and the processing module is further configured to: after sending the scheduling request on one carrier of the at least one carrier according to the received configuration parameter by using the transceiver module, determine a threshold length of the first timer according to n and start the first timer according to the determined threshold length of the first timer.

With reference to the twelfth or the thirteenth possible implementation manner of the first aspect, in a fourteenth possible implementation manner, the processing module is further configured to:

before sending the scheduling request on one carrier of the at least one carrier according to the received configuration parameter by using the transceiver module, determine whether the first timer times out; and the processing module is specifically configured to:

when the first timer times out, send the scheduling request on one carrier of the at least one carrier according to the received configuration parameter by using the transceiver module.

According to a second aspect, an embodiment of the present application provides a base station, including:

a processing module, configured to determine a configuration parameter for a scheduling request of a terminal, where the configuration parameter is used to assign the terminal a scheduling request resource, used by the terminal to send the scheduling request, on at least one carrier; and a sending module, configured to send the configuration parameter determined by the processing module to the terminal, to instruct the terminal to send the scheduling request on one carrier of the at least one carrier according to the configuration parameter after the scheduling request is triggered, where the at least one carrier includes at least one secondary carrier and a primary carrier; or the at least one carrier includes at least one secondary carrier.

With reference to the second aspect, in a first possible implementation manner, the configuration parameter includes a threshold of a first counter, where the threshold of the first counter is used to instruct the terminal to send the scheduling request on one carrier of the at least one carrier when the first counter is less than the threshold of the first counter; and the first counter is used to record a quantity of sending a scheduling request by the terminal in same uplink data transmission.

With reference to the second aspect or the first possible implementation manner of the second aspect, in a second possible implementation manner, the configuration parameter includes a threshold length of a first timer, where the threshold length of the first timer is used to instruct the terminal to send the scheduling request on one carrier of the at least one carrier according to the received configuration parameter when it is determined, according to the threshold length of the first timer, that the first timer times out;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time; and the threshold length of the first timer is a minimum time interval from a time at which the terminal sends a scheduling request this time back to a time at which the terminal sends a scheduling request last time in a same scheduling request process.

With reference to the second aspect or the first possible implementation manner of the second aspect, in a third possible implementation manner, the configuration parameter includes n, a threshold length of a first timer is n times a period of a scheduling request resource available to the terminal on a specific carrier of the at least one carrier, and n is a positive integer; where n is used to instruct the terminal to determine the threshold length of the first timer according to n, and send the scheduling request on one carrier of the at least one carrier according to the received configuration parameter when it is determined, according to the determined threshold length of the first timer, that the first timer times out;

the first timer is used to perform, in a same scheduling request process, timing on a time length from a current time back to a time at which the terminal sends a scheduling request last time;

the threshold length of the first timer is a minimum time interval from a time at which the terminal sends a scheduling request this time back to a time at which the terminal sends a scheduling request last time in a same scheduling request process; and when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum.

According to a third aspect, an embodiment of the present application provides a scheduling request sending method, including:

receiving, by a terminal, a configuration parameter, for a scheduling request, sent by a base station, where the configuration parameter is used to assign the terminal a scheduling request resource, used by the terminal to send the scheduling request, on at least one carrier serving the terminal; and sending, by the terminal according to the received configuration parameter, the scheduling request on one carrier of the at least one carrier after the scheduling request is triggered, where the at least one carrier includes at least one secondary carrier and a primary carrier; or the at least one carrier includes at least one secondary carrier.

With reference to the third aspect, in a first possible implementation manner, the sending, by the terminal according to the received configuration parameter, the scheduling request on one carrier of the at least one carrier includes:

selecting, by the terminal, one carrier from the at least one carrier; and sending the scheduling request on the selected carrier according to a configuration parameter that is used to configure a scheduling request resource on the selected carrier and that is in the received configuration parameter.

With reference to the third aspect, in a second possible implementation manner, the selecting, by the terminal, one carrier from the at least one carrier includes:

selecting, by the terminal, one carrier from the at least one carrier that has a valid scheduling request resource in a current transmission time interval TTI.

With reference to the second possible implementation manner of the third aspect, in a third possible implementation manner, the selecting, by the terminal, one carrier from the at least one carrier that has a valid scheduling request resource in a current TTI includes:

determining, by the terminal from the at least one carrier, a candidate carrier that is used to send the scheduling request, and selecting, by the terminal from the determined candidate carrier, a carrier that has a valid scheduling request resource in the current TTI, where the candidate carrier includes:

the at least one carrier; or an activated carrier in the at least one carrier.

With reference to the first possible implementation manner of the third aspect, in a fourth possible implementation manner, the selecting, by the terminal, one carrier from the at least one carrier includes:

selecting, by the terminal from the at least one carrier, a carrier whose configured scheduling request resource is the closest to a current TTI in terms of time; and before the sending the scheduling request on the selected carrier according to a configuration parameter that is used to configure a scheduling request resource on the selected carrier and that is in the received configuration parameter, the method further includes:

when a TTI of the scheduling request resource of the selected carrier arrives, determining, by the terminal, that the selected carrier has a valid scheduling request resource.

With reference to the first possible implementation manner of the third aspect, in a fifth possible implementation manner, the selecting, by the terminal, one carrier from the at least one carrier includes:

determining, by the terminal, whether the at least one carrier has a valid scheduling request resource in a current TTI; and if the at least one carrier has a valid scheduling request resource in the current TTI, selecting, by the terminal, one carrier from the determined carrier that has a valid scheduling request resource; or if the at least one carrier does not have a valid scheduling request resource in the current TTI, when a next TTI arrives, going back, by the terminal, to the step of determining whether the at least one carrier has a valid scheduling request resource.

With reference to any one of the second to the fifth possible implementation manners of the third aspect, in a sixth possible implementation manner, a carrier that satisfies at least one of following conditions is a carrier that has a valid scheduling request resource, where the conditions include:

there is an unreleased scheduling request resource on a carrier;

a carrier is activated;

a timer of a TAG group in which a carrier is located does not time out; and a quantity of sending a scheduling request by the terminal on a carrier is less than a maximum value of a quantity of sending a scheduling request by the terminal on the carrier.

With reference to any one of the third aspect or the first to the sixth possible implementation manners of the third aspect, in a seventh possible implementation manner, the configuration parameter includes a threshold of a first counter;

before the sending, by the terminal according to the received configuration parameter, the scheduling request on one carrier of the at least one carrier after the scheduling request is received, the method further includes: obtaining, by the terminal, the threshold of the first counter from the configuration parameter and determining whether the first counter is less than the threshold of the first counter, where the first counter is used to record a quantity of sending a scheduling request by the terminal in a same scheduling request process;

the sending, by the terminal, the scheduling request on one carrier of the at least one carrier according to the received configuration parameter includes: sending, by the terminal, the scheduling request on one carrier of the at least one carrier when the first counter is less than the threshold of the first counter; and after the sending, by the terminal, the scheduling request on one carrier of the at least one carrier according to the received configuration parameter, the method further includes: increasing, by the terminal, a value of the first counter by one.

With reference to the seventh possible implementation manner of the third aspect, in an eighth possible implementation manner, after the determining, by the terminal, whether the first counter is less than the threshold of the first counter, the method further includes:

when the first counter is not less than the threshold of the first counter, releasing, by the terminal, physical uplink control channel resources and/or uplink reference signal resources that are of all secondary carriers in the at least one carrier; or releasing, by the terminal, physical uplink control channel resources and/or uplink reference signal resources that are of carriers in physical uplink control channel groups in which all secondary carriers of the at least one carrier are located; or releasing, by the terminal, physical uplink control channel resources and/or uplink reference signal resources that are of all serving carriers.

With reference to the eighth possible implementation manner of the third aspect, in a ninth possible implementation manner, the releasing, by the terminal, physical uplink control channel resources and/or uplink reference signal resources that are of all secondary carriers in the at least one carrier includes:

when the at least one carrier includes only a secondary carrier, releasing, by the terminal, the physical uplink control channel resources and/or the uplink reference signal resources that are of all the secondary carriers in the at least one carrier.

With reference to the eighth possible implementation manner of the third aspect, in a tenth possible implementation manner, the releasing, by the terminal, physical uplink control channel resources and/or uplink reference signal resources that are of carriers in physical uplink control channel groups in which all secondary carriers of the at least one carrier are located includes:

when the at least one carrier includes only a secondary carrier, releasing, by the terminal, the physical uplink control channel resources and/or the uplink reference signal resources that are of all the carriers in the physical uplink control channel groups in which all the secondary carriers of the at least one carrier are respectively located.

With reference to the eighth possible implementation manner of the third aspect, in an eleventh possible implementation manner, the releasing, by the terminal, physical uplink control channel resources and/or uplink reference signal resources that are of all serving carriers includes:

when the at least one carrier includes only a secondary carrier and a primary carrier, releasing, by the terminal, physical uplink control channel resources on the uplink control channel and/or the uplink reference signal resources on the uplink control channel that are of all the serving carriers.

With reference to any one of the third aspect or the first to the eleventh possible implementation manners of the third aspect, in a twelfth possible implementation manner, the configuration parameter includes a threshold length of a first timer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process; and after the sending, by the terminal, the scheduling request on one carrier of the at least one carrier according to the received configuration parameter, the method further includes:

starting, by the terminal, the first timer according to a threshold length of the first timer.

With reference to any one of the third aspect or the first to the eleventh possible implementation manners of the third aspect, in a thirteenth possible implementation manner, the configuration parameter includes n, a threshold length of a first timer is n times a period of a scheduling request resource available to the terminal on a specific carrier of the at least one carrier, and n is a positive integer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process;

when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum; and after the sending, by the terminal, the scheduling request on one carrier of the at least one carrier according to the received configuration parameter, the method further includes:

determining, by the terminal, a threshold length of the first timer according to n, and starting the first timer according to the determined threshold length of the first timer.

With reference to the twelfth or the thirteenth possible implementation manner of the third aspect, in a fourteenth possible implementation manner, before the sending, by the terminal, the scheduling request on one carrier of the at least one carrier according to the received configuration parameter, the method further includes:

determining, by the terminal, whether the first timer times out; and the sending, by the terminal, the scheduling request on one carrier of the at least one carrier according to the received configuration parameter includes:

when the first timer times out, sending, by the terminal, the scheduling request on one carrier of the at least one carrier according to the received configuration parameter.

According to a fourth aspect, an embodiment of the present application provides a scheduling request receiving method, including:

determining, by a base station, a configuration parameter for a scheduling request of a terminal, where the configuration parameter is used to assign the terminal a scheduling request resource, used by the terminal to send the scheduling request, on at least one carrier; and sending, by the base station, the determined configuration parameter to the terminal, to instruct the terminal to send the scheduling request on one carrier of the at least one carrier according to the configuration parameter after the scheduling request is triggered, where the at least one carrier includes at least one secondary carrier and a primary carrier; or the at least one carrier includes at least one secondary carrier.

With reference to the fourth aspect, in a first possible implementation manner, the configuration parameter includes a threshold of a first counter, where the threshold of the first counter is used to instruct the terminal to send the scheduling request on one carrier of the at least one carrier when the first counter is less than the threshold of the first counter; and the first counter is used to record a quantity of sending a scheduling request by the terminal in same uplink data transmission.

With reference to the fourth aspect or the first possible implementation manner of the fourth aspect, in a second possible implementation manner, the configuration parameter includes a threshold length of a first timer, where the threshold length of the first timer is used to instruct the terminal to send the scheduling request on one carrier of the at least one carrier according to the received configuration parameter when it is determined, according to the threshold length of the first timer, that the first timer times out;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time; and the threshold length of the first timer is a minimum time interval from a time at which the terminal sends a scheduling request this time back to a time at which the terminal sends a scheduling request last time in a same scheduling request process.

With reference to the fourth aspect or the first possible implementation manner of the fourth aspect, in a third possible implementation manner, the configuration parameter includes n, a threshold length of a first timer is n times a period of a scheduling request resource available to the terminal on a specific carrier of the at least one carrier, and n is a positive integer;

n is used to instruct the terminal to determine the threshold length of the first timer according to n, and send the scheduling request on one carrier of the at least one carrier according to the received configuration parameter when it is determined, according to the determined threshold length of the first timer, that the first timer times out;

the first timer is used to perform, in a same scheduling request process, timing on a time length from a current time back to a time at which the terminal sends a scheduling request last time;

the threshold length of the first timer is a minimum time interval from a time at which the terminal sends a scheduling request this time back to a time at which the terminal sends a scheduling request last time in a same scheduling request process; and when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum.

Scheduling request resources are assigned to a terminal on multiple carriers by sending a configuration parameter, so that the terminal can send a scheduling request on one carrier of the multiple carriers according to the received configuration parameter. This provides a solution to effectively transmitting the scheduling request when the scheduling request resources are configured on the multiple carriers.

BRIEF DESCRIPTION OF THE DRAWINGS

FIG. 9B is a structural diagram of header information, of a MAC PDU, whose length field is 15 bits in an existing LTE system;

FIG. 10A is a structural diagram of header information, of a MAC PDU, whose length field is 23 bits according to an embodiment of the present application;

DETAILED DESCRIPTION OF ILLUSTRATIVE EMBODIMENTS

Figure 1:
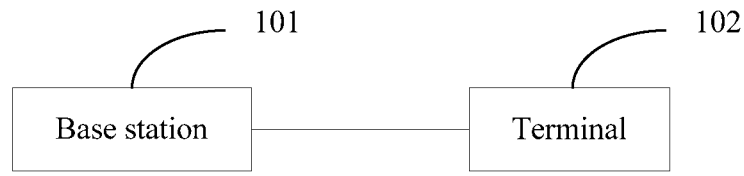
FIG. 1 is a schematic structural diagram of a wireless communications system according to an embodiment of the present application.

Embodiments of the present application provide a terminal, a base station, and a scheduling request transmission method, so as to provide a solution to effectively transmitting an SR when SR resources are configured on multiple carriers.

In the embodiments of the present application, a base station determines a configuration parameter for a scheduling request of a terminal, where the configuration parameter is used to assign the terminal a scheduling request resource, used by the terminal to send the scheduling request, on at least one carrier. After the scheduling request is triggered, the terminal sends the scheduling request on one carrier of the at least one carrier according to the received configuration parameter, where the at least one carrier includes at least one secondary carrier and a primary carrier or the at least one carrier includes at least one secondary carrier.

Scheduling request resources are assigned to a terminal on multiple carriers by sending a configuration parameter, so that the terminal can send a scheduling request on one carrier of the multiple carriers according to the received configuration parameter. This provides a solution to effectively transmitting the scheduling request when the scheduling request resources are configured on the multiple carriers.

First, a basic principle related to the scheduling request is introduced.

In an existing LTE system, an eNB may indicate, to UE by sending a configuration parameter used to configure an SR resource, information such as an SR resource available to the UE, a period of the SR resource, a subframe offset, a maximum quantity of sending, and an SR prohibit timer. After the SR is triggered, the UE sends the SR according to the configuration parameter to request for assigning an uplink resource.

Specifically, when the SR is triggered, for example, after a regular buffer status report (BSR) is triggered because the uplink data needs to be sent, if there is no uplink resource such as a physical uplink shared channel (PUSCH) used to transmit the BSR, the UE triggers the SR.

Further, if there is no valid SR resource, the UE may trigger an uplink random access procedure to cancel the triggered SR.

If there is a valid SR resource in a current TTI, the SR prohibit timer does not run, and a quantity of sending times of the SR does not reach a maximum quantity of sending times, the UE sends the SR to the eNB.

If a quantity of sending times of the SR reaches a maximum quantity of sending times, the UE releases physical uplink control channel (PUCCH) resources and/or sounding reference signal (SRS) resources that are of all carriers, triggers the uplink random access procedure, and cancels the triggered SR.

For the UE, a scheduling request process of the UE refers to a process in which the UE sends the scheduling request within duration from a time point when the scheduling request is triggered to a time when the scheduling request is canceled.

A trigger condition of the SR includes: when uplink data arrives and a regular BSR is triggered, but there is no uplink resource used to transmit the BSR, the SR is triggered.

A cancellation condition of the SR includes: the BSR used to trigger the SR is sent by the UE, or the uplink data is sent by the UE.

The following describes the embodiments of the present application in detail with reference to accompanying drawings.

First, a wireless communications system provided in the embodiments of the present application is introduced, and then a terminal, a base station, and a scheduling request sending method and receiving method are introduced.

FIG. 1 is a schematic structural diagram of a wireless communications system according to an embodiment of the present application. As shown in FIG. 1, the wireless communications system includes a base station 101 and a terminal 102.

The base station 101 is configured to determine a configuration parameter for a scheduling request of the terminal 102 and send the determined configuration parameter to the terminal, where the configuration parameter is used to assign the terminal 102 a scheduling request resource, used by the terminal 102 to send the scheduling request, on at least one carrier serving the terminal 102.

It may be understood that a carrier and a serving cell may be used interchangeably. This is not limited in the present application.

The terminal 102 is configured to: after the scheduling request is triggered, send the scheduling request on one carrier of the at least one carrier according to the received configuration parameter.

Optionally, the base station 101 receives the scheduling request that is sent by the terminal 102 on the scheduling request resource assigned in the configuration parameter.

A communications standard of the wireless communications system provided in this embodiment of the present application includes but is not limited to Global system for mobile communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplexing-Long Term Evolution (TDD LTE), Frequency Division Duplexing-Long Term Evolution (FDD LTE), Long Term Evolution-Advanced (LTE-advanced), personal handyphone system (PHS), Wireless Fidelity (WiFi) stipulated in the 802.11 series protocols, Worldwide Interoperability for Microwave Access (WiMAX), and the like.

The terminal 102 may include but be not limited to a mobile phone, a tablet computer, a personal digital assistant (PDA), a point of sales (POS), a vehicle-mounted computer, and the like.

The base station 101 may further include a radio resource management device and the like; and the terminal 102 is a terminal device communicating with the base station 101, including user equipment, a relay node, and the like.

For example, for an LTE system such as TDD LTE, FDD LTE, or LTE-A, the base station 101 in the wireless communications system provided in this embodiment of the present application may be an evolved NodeB (eNodeB), and the terminal 102 may be UE. For a TD-SCDMA system or a WCDMA system, the base station 101 in the wireless communications system provided in this embodiment of the present application may include a NodeB, or include a NodeB and a radio network controller (RNC), and the terminal 102 may be UE. For a GSM system, the base station 101 provided in this embodiment of the present application may include a base transceiver station (BTS), or include a BTS and a base station controller (BSC), and the terminal 102 may be a mobile station (MS). For a WiFi system, the base station 101 may include an access point (AP) and/or an access controller (AC), and the terminal 102 may be a station (STA).

The scheduling request may be a request that is sent by the terminal 102 to the base station 101, used to request an uplink resource, for example, an SR in the LTE system and the like.

The at least one carrier may include at least one secondary carrier and a primary carrier; or the at least one carrier may include at least one secondary carrier but not include a primary carrier.

For each carrier in the at least one carrier, the configuration parameter sent by the base station 101 may include but be not limited to at least one of following information:

a scheduling request resource of the carrier;
a period of the scheduling request resource of the carrier; and
indication information that is used to indicate a subframe offset of the scheduling request resource of the carrier.

The configuration parameter sent by the base station 101 may further include:

a threshold of a first counter, where the first counter is used to record a quantity of sending a scheduling request by the terminal 102 in a same scheduling request process.

The configuration parameter sent by the base station 101 may further include: a threshold length of a first timer. When the threshold length of the first timer is n times a period of a scheduling request resource available to the terminal 102 on a specific carrier of the at least one carrier, where n is a positive integer, the configuration parameter may include a value of n, and the terminal 102 may determine the threshold length of the first timer according to the multiple and the period corresponding to the specific carrier.

The first timer may avoid a case in which the terminal 102 frequently sends the scheduling request without receiving uplink scheduling. This causes high power consumption of the terminal 102 and generates uplink interference.

The first timer is used to perform, in a same scheduling request process, timing on a time length from a current time back to a time at which the terminal 102 sends a scheduling request last time. When a length of the first timer reaches the threshold length of the first timer, the first timer stops running, that is, stops timing.

Alternatively, the first timer is used to perform, in a same scheduling request process, timing on a time length from a current time to a time at which the terminal 102 can send a scheduling request next time. When the length of the first timer is reduced to 0, the first timer stops running, that is, stop timing.

The threshold length of the first timer is a minimum time interval from a time at which the terminal 102 sends a scheduling request this time back to a time at which the terminal 102 sends a scheduling request last time in a same scheduling request process.

The specific carrier may be determined by the terminal 102 itself, or predefined in a protocol, or preconfigured by the base station 101. For example, refer to the following analysis to learn which carrier is the specific carrier, in other words, how the terminal 102 determines the specific carrier.

The configuration parameter may be sent by using one or more of the following messages:

a radio resource control (RRC) connection reconfiguration message;
an RRC connection setup message;
another RRC message; and
a message of other layer than RRC, such as a Medium Access Control (MAC) layer, a Radio Link Control (RLC) layer, or a physical (PHY) layer.

Optionally, if the configuration parameter includes the threshold of the first counter, the terminal 102 may obtain the threshold of the first counter from the configuration parameter and determine whether the first counter is less than the threshold of the first counter.

When the first counter is less than the threshold of the first counter, the terminal 102 sends the scheduling request on one carrier of the at least one carrier.

Optionally, after sending the scheduling request, the terminal 102 increases the first counter by 1.

Optionally, if the first counter is not less than the threshold of the first counter, for different cases, the terminal 102 may have the following three different optional implementation manners.

Optional Implementation Manner 1

If the at least one carrier includes only a secondary carrier, and the first counter is not less than the threshold of the first counter, it may indicate that quality of an uplink channel or uplink reference signal carried on the secondary carrier of the terminal 102 is relatively poor. In this case, optionally, the terminal 102 may release physical uplink control channel (PUCCH) resources and/or uplink reference signal (such as SRS) resources that are of all carriers in the at least one carrier.

Further, the UE performs a random access procedure on a primary carrier and cancels the triggered SR.

Optional Implementation Manner 2

If the at least one carrier includes only a secondary carrier, optionally, the terminal 102 may release physical uplink control channel (PUCCH) resources and/or uplink reference signal (such as SRS) resources that are of all carriers in physical uplink control channel group (PUCCH group) in which all secondary carriers of the at least one carrier are respectively located.

The physical uplink control channel group includes at least one carrier that shares a physical uplink control channel resource on a same carrier. Generally, radio channel environments in which carriers of a same physical uplink control channel group are located are similar. Therefore, if the at least one carrier includes only a secondary carrier and the first counter is not less than the threshold of the first counter, it may indicate that quality of a physical uplink channel or an uplink reference signal carried on the secondary carrier of the terminal 102 is relatively poor. Therefore, the terminal 102 may release the physical uplink control channel resources and/or the uplink reference signal resources that are of all the carriers in the physical uplink control channel groups in which all the secondary carriers are respectively located.

Further, the UE performs a random access procedure on a primary carrier and cancels the triggered SR.

Optional Implementation Manner 3

If the at least one carrier includes only a secondary carrier and a primary carrier, and the first counter is not less than the threshold of the first counter, quality of uplink channels or uplink reference signals carried on serving carriers, including a primary carrier and a secondary carrier, of the terminal 102 is relatively poor. Therefore, optionally, the terminal 102 may release physical uplink control channel resources and/or uplink reference signal resources that are of all serving carriers.

The serving carriers of the terminal 102 may include carriers serving the terminal 102, including a primary carrier and a secondary carrier.

Further, the UE may continue to perform a scheduling request process on the primary carrier.

Optionally, if the configuration parameter includes the threshold length of the first timer, the terminal 102 obtains the threshold length of the first timer from the received configuration parameter.

Alternatively, if the configuration parameter includes the value of n, after receiving the configuration parameter, the terminal 102 obtains the value of n from the configuration parameter, and determines the threshold length of the first timer according to the value of n and the period of the scheduling request resource that can be used on the specific carrier.

Optionally, after sending the scheduling request, the terminal 102 may start the first timer.

Optionally, before sending the scheduling request, the terminal 102 may further determine whether the first timer times out; if the first timer times out (that is, the first timer does not run), the terminal 102 sends the scheduling request on one carrier of the at least one carrier according to the received configuration parameter.

As described above, the specific carrier may be determined by the terminal 102 itself, or predefined in a protocol, or preconfigured by the base station 101. For example, when the at least one carrier includes a primary carrier, the specific carrier is the primary carrier of the terminal 102. Because the primary carrier cannot be deactivated, a scheduling request resource of the terminal 102 on the primary carrier is always available. Therefore, the length, of the threshold of the first timer, that is determined according to the period of the primary carrier is definite, remaining unchanged generally.

Alternatively, the specific carrier is a carrier, of the at least one carrier, on which the period of the scheduling request resource is minimum. Because an integer multiple of the minimum period is used, configuration of the threshold length of the first timer is relatively flexible, so that a sending interval of the scheduling request is not excessively restricted, and a transmission delay of the scheduling request is shortened.

Alternatively, the specific carrier is a carrier, of activated carries of the at least one carrier, on which the period of the scheduling request resource is minimum. Similarly, because an integer multiple of the minimum period is used, configuration of the threshold length of the first timer is relatively flexible, so that a sending interval of the scheduling request is not excessively restricted, and a transmission delay of the scheduling request is shortened.

The optional implementation manners related to the first timer and the first counter are described above. The following describes optional implementation manners adoptable by the terminal 102 when sending the scheduling request.

Optionally, after receiving the configuration parameter, the terminal 102 first selects one carrier from the at least one carrier; the terminal 102 sends the scheduling request on the selected carrier according to a configuration parameter that is used to configure a scheduling request resource on the selected carrier and that is in the received configuration parameter.

For example, the terminal 102 determines, according to the configuration parameter that is used to configure the scheduling request resource on the selected carrier and that is in the received configuration parameter, a scheduling request resource available to the terminal 102 on the selected carrier. The terminal 102 sends the scheduling request on the determined scheduling request resource on the selected carrier. The following specifically describes optional implementation solutions.

Optional Implementation Solution 1

The terminal 102 selects one carrier from the at least one carrier that has a valid scheduling request resource in a current transmission time interval (TTI). The terminal 102 sends the scheduling request on the selected carrier according to a configuration parameter that is used to configure a scheduling request resource on the selected carrier and that is in the configuration parameter.

A manner of selecting a carrier by the terminal 102 may include but be not limited to the following.

Manner 1: If there is a secondary carrier in the at least one carrier that has a valid scheduling request resource, the terminal 102 selects one carrier from the secondary carrier.

Manner 2: The terminal 102 selects a carrier according to a carrier sequence number, for example, the terminal 102 selects a carrier with a smaller carrier sequence number from the at least one carrier having a valid scheduling request resource.

Manner 3: Random selection.

Manner 4: The terminal 102 selects a carrier, receiving minimum uplink interference, from the at least one carrier that has a valid scheduling request resource.

Manner 5: If there is only one carrier, in the at least one carrier, that has a valid scheduling request resource, the carrier is directly selected. In other words, the terminal 102 does not need to select a carrier in this case.

Optional Implementation Solution 2

The terminal 102 determines, from the at least one carrier, a candidate carrier that is used to send a scheduling request. The terminal 102 selects, from the determined candidate carrier, a carrier that has a valid scheduling request resource in a current TTI. The selecting manner is similar to that in optional implementation solution 1. This is not described herein. Because the carrier that has a valid scheduling request resource in the current TTI is selected, the scheduling request can be sent immediately, thereby improving uplink data transmission efficiency.

The candidate carrier includes:

the at least one carrier; or an activated carrier in the at least one carrier.

In this embodiment of the present application, the terminal 102 may determine, according to an indication message sent by the base station 101, whether a carrier is activated. The indication message may be a MAC layer message, for example, an activated MAC control element (CE) message, and/or a deactivated MAC CE message.

Alternatively, whether a carrier is activated is determined according to the indication message and a preset time. For example, after receiving an activated MAC CE message, sent by the base station 101, for a carrier, the terminal 102 may determine that within a length of the preset time after the message is received, the carrier is activated, and the carrier is deactivated beyond the length of the preset time.

Optional Implementation Solution 3

The terminal 102 selects, from the at least one carrier, one carrier whose configured scheduling request resource is the closest to a current TTI. When a TTI of the scheduling request resource of the selected carrier arrives, if the selected carrier has a valid scheduling request resource, the terminal 102 sends the scheduling request on the selected carrier according to a configuration parameter that is used to configure the scheduling request resource on the selected carrier and that is in the configuration parameter.

By applying the optional implementation solution 3, the terminal 102 may send the scheduling request as soon as possible, thereby improving uplink data transmission efficiency.

Optional Implementation Manner 4

The terminal 102 determines whether the at least one carrier has a valid scheduling request resource in a current TTI.

If the at least one carrier has a valid scheduling request resource in the current TTI, the terminal 102 selects one carrier from the determined carrier that has a valid scheduling request resource, and sends the scheduling request on the selected carrier according to the received configuration parameter. A selection solution is similar to optional implementation solution 1, and same details are not described again.

If the at least one carrier does not have a valid scheduling request resource in the current TTI, when a next TTI arrives, the terminal goes back to the step of determining whether the at least one carrier has a valid scheduling request resource.

In the foregoing optional solutions, optionally, a carrier that satisfies at least one of the following conditions may be defined as a carrier that has a valid scheduling request resource, where the conditions include:

there is an unreleased scheduling request resource on a carrier;

a carrier is activated;

a timer of a timing advance group (TAG) in which a carrier is located does not time out; and a quantity of sending a scheduling request by the terminal 102 on a carrier is less than a maximum value of a quantity of sending a scheduling request by the terminal 102 on the carrier.

Specifically, an available scheduling request resource may be a valid scheduling request resource, and may refer to a configured scheduling request resource, or, a configured scheduling request resource where a carrier on which the scheduling request resource is located is activated.

Optionally, after the terminal sends the scheduling request, or after the terminal triggers the scheduling request, if the at least one carrier includes only a secondary carrier, optionally, the terminal 102 performs a random access procedure on a primary carrier and cancels the triggered SR if all carriers of the at least one carrier are deactivated.

The foregoing describes the wireless communications system provided in this embodiment of the present application. Based on a same inventive concept, the embodiments of the present application further provide a terminal, a base station, and a scheduling request transmission method. Because a problem-resolving principle of the terminal, the base station, and the scheduling request transmission method is similar to that of the wireless communications system provided in this embodiment of the present application, reference may be made to implementation of the system for implementation of the terminal, the base station, and the scheduling request transmission method, and details are not described herein.

Figure 2:
FIG. 2 is a schematic structural diagram of a first terminal according to an embodiment of the present application.

FIG. 2 is a schematic structural diagram of a first terminal according to an embodiment of the present application. As shown in FIG. 2, the terminal includes:

a transceiver module 201, configured to receive a configuration parameter, for a scheduling request, sent by a base station, where the configuration parameter is used to assign the terminal a scheduling request resource, used by the terminal to send the scheduling request, on at least one carrier serving the terminal; and a processing module 202, configured to: after the scheduling request is triggered, send, according to the configuration parameter received by the transceiver module 201, the scheduling request on one carrier of the at least one carrier by using the transceiver module 201, where the at least one carrier includes at least one secondary carrier and a primary carrier; or the at least one carrier includes at least one secondary carrier.

Optionally, the processing module 202 is specifically configured to:

select one carrier from the at least one carrier; and send the scheduling request on the selected carrier according to a configuration parameter that is used to configure a scheduling request resource on the selected carrier and that is in the received configuration parameter.

Optionally, the processing module 202 is specifically configured to:

select one carrier from at least one carrier that has a valid scheduling request resource in a current transmission time interval TTI.

Optionally, the processing module 202 is specifically configured to:

determine, from the at least one carrier, a candidate carrier that is used to send the scheduling request, and select, from the determined candidate carrier, a carrier that has a valid scheduling request resource in the current TTI, where the candidate carrier includes:

the at least one carrier; or an activated carrier in the at least one carrier.

Optionally, the processing module 202 is specifically configured to:

select, from the at least one carrier, a carrier whose configured scheduling request resource is the closest to a current TTI in terms of time; and the processing module 202 is further configured to: before sending the scheduling request on the selected carrier according to a configuration parameter that is used to configure a scheduling request resource on the selected carrier and that is in the received configuration parameter, when a TTI of the scheduling request resource of the selected carrier arrives, determine that the selected carrier has a valid scheduling request resource.

Optionally, the processing module 202 is specifically configured to:

determine whether the at least one carrier has a valid scheduling request resource in a current TTI; and if the at least one carrier has a valid scheduling request resource in the current TTI, select one carrier from the determined carrier that has a valid scheduling request resource; or if the at least one carrier does not have a valid scheduling request resource in the current TTI, when a next TTI arrives, go back to the step of determining whether the at least one carrier has a valid scheduling request resource.

Optionally, a carrier that satisfies at least one of the following conditions is a carrier that has a valid scheduling request resource, where the conditions include:

there is an unreleased scheduling request resource on a carrier;

a carrier is activated;

a timer of a TAG group in which a carrier is located does not time out; and a quantity of sending a scheduling request by the terminal on a carrier is less than a maximum value of a quantity of sending a scheduling request by the terminal on the carrier.

Optionally, the configuration parameter includes a threshold of a first counter;

the processing module 202 is further configured to: after the transceiver module 201 receives the configuration parameter, and before the processing module 202 sends the scheduling request on one carrier of the at least one carrier according to the received configuration parameter by using the transceiver module 201, obtain the threshold of the first counter from the configuration parameter and determine whether the first counter is less than the threshold of the first counter, where the first counter is used to record a quantity of sending a scheduling request by the terminal in a same scheduling request process;

the processing module 202 is specifically configured to: when the first counter is less than the threshold of the first counter, send the scheduling request on one carrier of the at least one carrier by using the transceiver module 201; and the processing module 202 is further configured to: after the transceiver module 201 sends the scheduling request on one carrier of the at least one carrier according to the received configuration parameter, increase a value of the first counter by one.

Optionally, the processing module 202 is further configured to: after determining whether the first counter is less than the threshold of the first counter, when the first counter is not less than the threshold of the first counter, release physical uplink control channel resources and/or uplink reference signal resources that are of all secondary carriers in the at least one carrier; or release physical uplink control channel resources and/or uplink reference signal resources that are of carriers in physical uplink control channel groups in which all secondary carriers of the at least one carrier are located; or release physical uplink control channel resources and/or uplink reference signal resources that are of all serving carriers.

Optionally, the processing module 202 is specifically configured to:

when the at least one carrier includes only a secondary carrier, release the physical uplink control channel resources and/or the uplink reference signal resources that are of all the secondary carriers in the at least one carrier.

Optionally, the processing module 202 is specifically configured to:

when the at least one carrier includes only a secondary carrier, release the physical uplink control channel resources and/or the uplink reference signal resources that are of all the carriers in the physical uplink control channel groups in which all the secondary carriers of the at least one carrier are respectively located.

Optionally, the processing module 202 is specifically configured to:

when the at least one carrier includes only a secondary carrier and a primary carrier, release the physical uplink control channel resources on the uplink control channel and/or the uplink reference signal resources on the uplink control channel that are of all the serving carriers.

Optionally, the configuration parameter includes a threshold length of a first timer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process; and the processing module 202 is further configured to: after sending the scheduling request on one carrier of the at least one carrier according to the received configuration parameter by using the transceiver module 201, start the first timer according to a threshold length of the first timer.

Optionally, the configuration parameter includes n, a threshold length of a first timer is n times a period of a scheduling request resource available to the terminal on a specific carrier of the at least one carrier, and n is a positive integer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process;

when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum; and the processing module 202 is further configured to: after sending the scheduling request on one carrier of the at least one carrier according to the received configuration parameter by using the transceiver module 201, determine a threshold length of the first timer according to n and start the first timer according to the determined threshold length of the first timer.

Optionally, the processing module 202 is further configured to:

before sending the scheduling request on one carrier of the at least one carrier according to the received configuration parameter by using the transceiver module 201, determine whether the first timer times out; and the processing module 202 is specifically configured to:

when the first timer times out, send the scheduling request on one carrier of the at least one carrier according to the received configuration parameter by using the transceiver module 201.

For another optional implementation manner of the terminal, refer to the terminal 102; and details are not described herein.

Figure 3A:
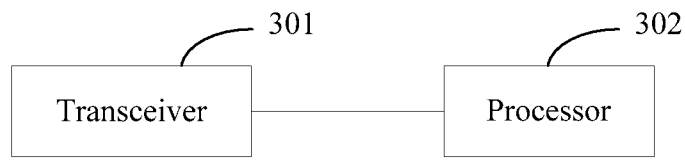
FIG. 3A and FIG. 3B are respectively schematic structural diagrams of two kinds of implementation of a first terminal according to an embodiment of the present application.
Figure 3B:
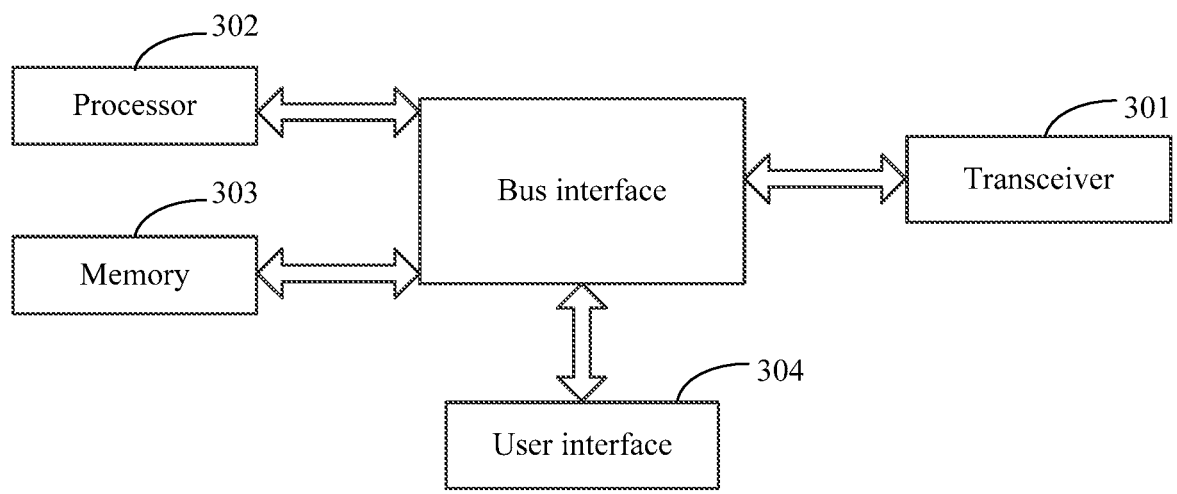

In addition, the terminal may be implemented by using a structure shown in FIG. 3A or FIG. 3B, the processing module 202 may be implemented by a processor 302, and the transceiver module 201 may be implemented by a transceiver 301.

Optionally, as shown in FIG. 3B, the structure may further include a memory 303. Optionally, the memory 303 may store a control instruction, and the processor 302 invokes the instruction stored in the memory 303 to execute various processing operations.

In FIG. 3B, a bus architecture may include any quantity of interconnected buses and bridges. Specifically, various circuits of one or more processors represented by the processor 302 and a memory represented by the memory 303 are linked together. In the bus architecture, various other circuits of a peripheral device, a voltage regulator, and a power management circuit may further be linked together, which is well-known in the art. Therefore, no further description is provided in this specification. A bus interface provides an interface. The transceiver 301 may be multiple elements, including a transmitter and a receiver, and providing units for communicating with various other apparatuses on a transmission medium. For different user equipment, a user interface 304 may further be an interface that can externally or internally connect to required devices, where the connected devices include but are not limited to a keypad, a display screen, a loudspeaker, a microphone, a joystick, and the like.

Figure 4:
FIG. 4 is a schematic structural diagram of a first base station according to an embodiment of the present application.

FIG. 4 is a schematic structural diagram of a first base station according to an embodiment of the present application. As shown in FIG. 4, the base station includes:

a processing module 401, configured to determine a configuration parameter for a scheduling request of a terminal, where the configuration parameter is used to assign the terminal a scheduling request resource, used by the terminal to send the scheduling request, on at least one carrier; and a sending module 402, configured to send the configuration parameter determined by the processing module 401 to the terminal, to instruct the terminal to send the scheduling request on one carrier of the at least one carrier according to the configuration parameter after the scheduling request is triggered, where the at least one carrier includes at least one secondary carrier and a primary carrier; or the at least one carrier includes at least one secondary carrier.

Optionally, the configuration parameter includes a threshold of a first counter, where the threshold of the first counter is used to instruct the terminal to send the scheduling request on one carrier of the at least one carrier when the first counter is less than the threshold of the first counter; and the first counter is used to record a quantity of sending a scheduling request by the terminal in same uplink data transmission.

Optionally, the configuration parameter includes a threshold length of a first timer, where the threshold length of the first timer is used to instruct the terminal to send the scheduling request on one carrier of the at least one carrier according to the received configuration parameter when it is determined, according to the threshold length of the first timer, that the first timer times out;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process.

Optionally, the configuration parameter includes n, a threshold length of a first timer is n times a period of a scheduling request resource available to the terminal on a specific carrier of the at least one carrier, and n is a positive integer;

n is used to instruct the terminal to determine the threshold length of the first timer according to n, and send the scheduling request on one carrier of the at least one carrier according to the received configuration parameter when it is determined, according to the determined threshold length of the first timer, that the first timer times out;

the first timer is used to perform, in a same scheduling request process, timing on a time length from a current time back to a time at which the terminal sends a scheduling request last time;

the threshold length of the first timer is a minimum time interval from a time at which the terminal sends a scheduling request this time back to a time at which the terminal sends a scheduling request last time in a same scheduling request process; and when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum.

For another optional implementation manner of the base station, refer to the base station 101; and details are not described herein.

Figure 5A:
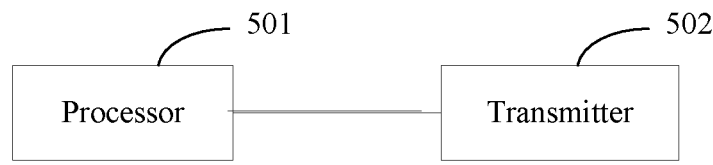
FIG. 5A and FIG. 5B are respectively schematic structural diagrams of two kinds of implementation of a first base station according to an embodiment of the present application.
Figure 5B:
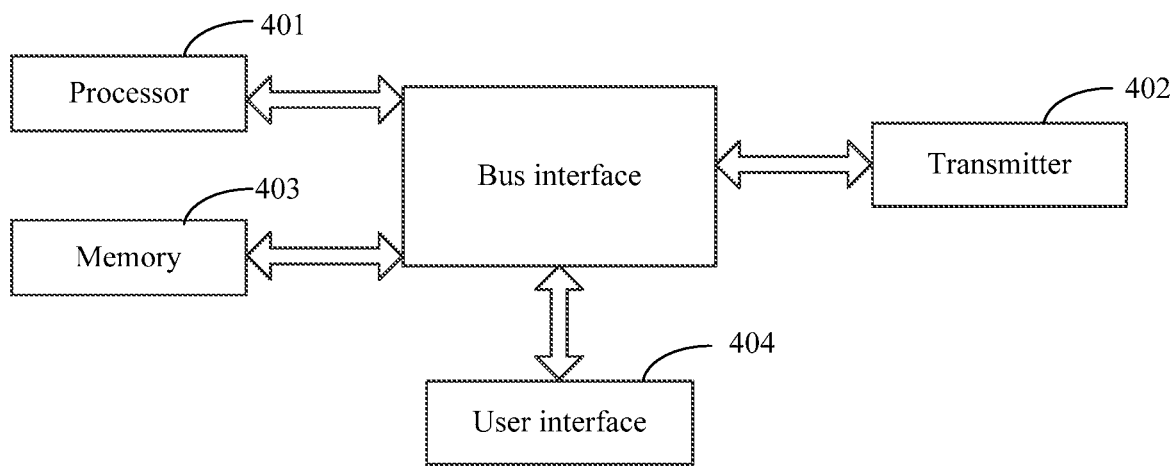

In addition, the base station may be implemented by using a structure shown in FIG. 5A or FIG. 5B, the processing module 401 may be implemented by a processor 501, and the sending module 402 may be implemented by a transmitter 502.

Optionally, as shown in FIG. 5B, the structure may further include a memory 503. Optionally, the memory 503 may store a control instruction, and the processor 501 invokes the instruction stored in the memory 503 to execute various processing operations.

In FIG. 5B, a bus architecture may include any quantity of interconnected buses and bridges. Specifically, various circuits of one or more processors represented by the processor 501 and a memory represented by the memory 503 are linked together. In the bus architecture, various other circuits of a peripheral device, a voltage regulator, and a power management circuit may further be linked together, which is well-known in the art. Therefore, no further description is provided in this specification. A bus interface provides an interface. For different user equipment, a user interface 504 may further be an interface that can externally or internally connect to required devices, where the connected devices include but are not limited to a keypad, a display screen, a loudspeaker, a microphone, a joystick, and the like.

Figure 6:
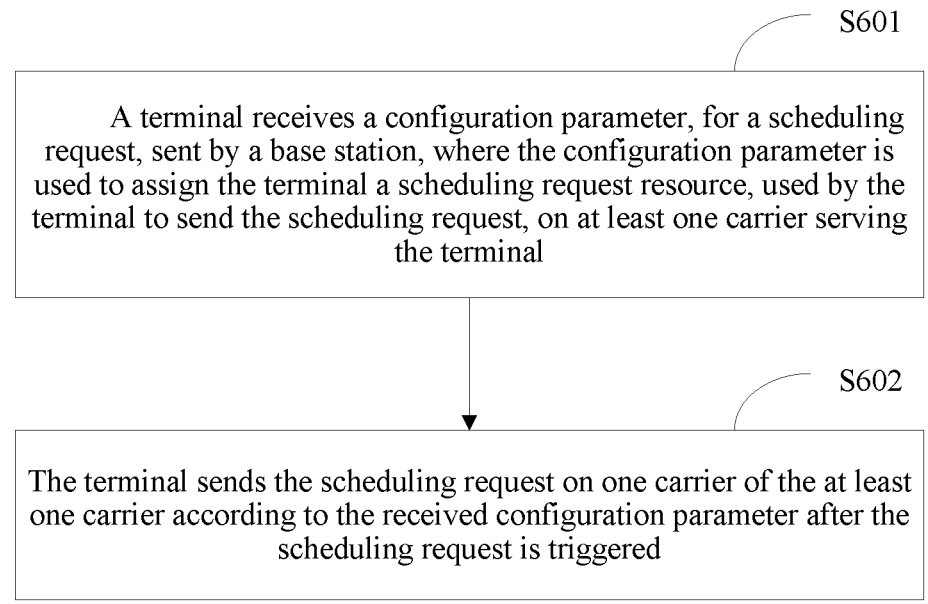
FIG. 6 is a flowchart of a scheduling request sending method according to an embodiment of the present application.

FIG. 6 is a flowchart of a scheduling request sending method according to an embodiment of the present application. As shown in FIG. 6, the method includes the following steps:

S601. A terminal receives a configuration parameter, for a scheduling request, sent by a base station.

The configuration parameter is used to assign the terminal a scheduling request resource, used by the terminal to send the scheduling request, on at least one carrier serving the terminal.

S602. The terminal sends the scheduling request on one carrier of the at least one carrier according to the received configuration parameter after the scheduling request is triggered.

The at least one carrier includes at least one secondary carrier and a primary carrier; or the at least one carrier includes at least one secondary carrier.

Optionally, in step S602, that the terminal sends the scheduling request on one carrier of the at least one carrier according to the received configuration parameter includes:

the terminal selects one carrier from the at least one carrier; and the terminal sends the scheduling request on the selected carrier according to a configuration parameter that is used to configure a scheduling request resource on the selected carrier and that is in the received configuration parameter.

Optionally, the terminal selects one carrier from at least one carrier that has a valid scheduling request resource in a current transmission time interval TTI.

Optionally, the terminal determines, from the at least one carrier, a candidate carrier that is used to send the scheduling request, and selects, from the determined candidate carrier, a carrier that has a valid scheduling request resource in the current TTI.

The candidate carrier includes:

the at least one carrier; or an activated carrier in the at least one carrier.

Optionally, the terminal selects, from the at least one carrier, a carrier whose configured scheduling request resource is the closest to a current TTI in terms of time; and before the terminal sends the scheduling request on the selected carrier according to the configuration parameter that is used to configure the scheduling request resource on the selected carrier and that is in the received configuration parameter, the method further includes:

when a TTI of the scheduling request resource of the selected carrier arrives, determining, by the terminal, that the selected carrier has a valid scheduling request resource.

Optionally, the terminal determines whether the at least one carrier has a valid scheduling request resource in a current TTI; and if the at least one carrier has a valid scheduling request resource in the current TTI, the terminal selects one carrier from the determined carrier that has a valid scheduling request resource; or if the at least one carrier does not have a valid scheduling request resource in the current TTI, when a next TTI arrives, the terminal goes back to the step of determining whether the at least one carrier has a valid scheduling request resource.

Optionally, a carrier that satisfies at least one of the following conditions is a carrier that has a valid scheduling request resource, where the conditions include:

there is an unreleased scheduling request resource on a carrier;

a carrier is activated;

a timer of a TAG group in which a carrier is located does not time out; and a quantity of sending a scheduling request by the terminal on a carrier is less than a maximum value of a quantity of sending a scheduling request by the terminal on the carrier.

Optionally, the configuration parameter includes a threshold of a first counter;

before the terminal sends the scheduling request on one carrier of the at least one carrier according to the received configuration parameter after receiving the configuration parameter, the method further includes: obtaining, by the terminal, the threshold of the first counter from the configuration parameter and determining whether the first counter is less than the threshold of the first counter, where the first counter is used to record a quantity of sending a scheduling request by the terminal in a same scheduling request process;

in step S602, that the terminal sends the scheduling request on one carrier of the at least one carrier according to the received configuration parameter includes: the terminal sends the scheduling request on one carrier of the at least one carrier when the first counter is less than the threshold of the first counter; and after the terminal sends the scheduling request on one carrier of the at least one carrier according to the received configuration parameter, the method further includes: increasing, by the terminal, a value of the first counter by one.

Optionally, after the terminal determines whether the first counter is less than the threshold of the first counter, the method further includes:

when the first counter is not less than the threshold of the first counter, releasing, by the terminal, physical uplink control channel resources and/or uplink reference signal resources that are of all secondary carriers in the at least one carrier; or releasing, by the terminal, physical uplink control channel resources and/or uplink reference signal resources that are of carriers in physical uplink control channel groups in which all secondary carriers of the at least one carrier are located; or releasing, by the terminal, physical uplink control channel resources and/or uplink reference signal resources that are of all serving carriers.

Optionally, the releasing, by the terminal, physical uplink control channel resources and/or uplink reference signal resources that are of all secondary carriers in the at least one carrier includes:

when the at least one carrier includes only a secondary carrier, releasing, by the terminal, the physical uplink control channel resources and/or the uplink reference signal resources that are of all the secondary carriers in the at least one carrier.

Optionally, the releasing, by the terminal, physical uplink control channel resources and/or uplink reference signal resources that are of carriers in physical uplink control channel groups in which all secondary carriers of the at least one carrier are located includes:

when the at least one carrier includes only a secondary carrier, releasing, by the terminal, the physical uplink control channel resources and/or the uplink reference signal resources that are of all the carriers in the physical uplink control channel groups in which all the secondary carriers of the at least one carrier are respectively located.

Optionally, the releasing, by the terminal, physical uplink control channel resources and/or uplink reference signal resources that are of all serving carriers includes:

when the at least one carrier includes only a secondary carrier and a primary carrier, releasing, by the terminal, the physical uplink control channel resources on the uplink control channel and/or the uplink reference signal resources on the uplink control channel that are of all the serving carriers.

Optionally, the configuration parameter includes a threshold length of a first timer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process; and after the terminal sends the scheduling request on one carrier of the at least one carrier according to the received configuration parameter, the method further includes:

starting, by the terminal, the first timer according to a threshold length of the first timer.

Optionally, the configuration parameter includes n, a threshold length of a first timer is n times a period of a scheduling request resource available to the terminal on a specific carrier of the at least one carrier, and n is a positive integer;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time;

the threshold length of the first timer is a minimum time interval from a time at which the terminal sends a scheduling request this time back to a time at which the terminal sends a scheduling request last time in a same scheduling request process; and when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum; and after the terminal sends the scheduling request on one carrier of the at least one carrier according to the received configuration parameter, the method further includes:

determining, by the terminal, a threshold length of the first timer according to n, and starting the first timer according to the determined threshold length of the first timer.

Optionally, in step S602, before the terminal sends the scheduling request on one carrier of the at least one carrier according to the received configuration parameter, the method further includes:

determining, by the terminal, whether the first timer times out; and that the terminal sends the scheduling request on one carrier of the at least one carrier according to the received configuration parameter includes:

when the first timer times out, the terminal sends the scheduling request on one carrier of the at least one carrier according to the received configuration parameter.

For another optional implementation manner of the method, refer to the processing of the terminal 102; and details are not described herein.

Figure 7:
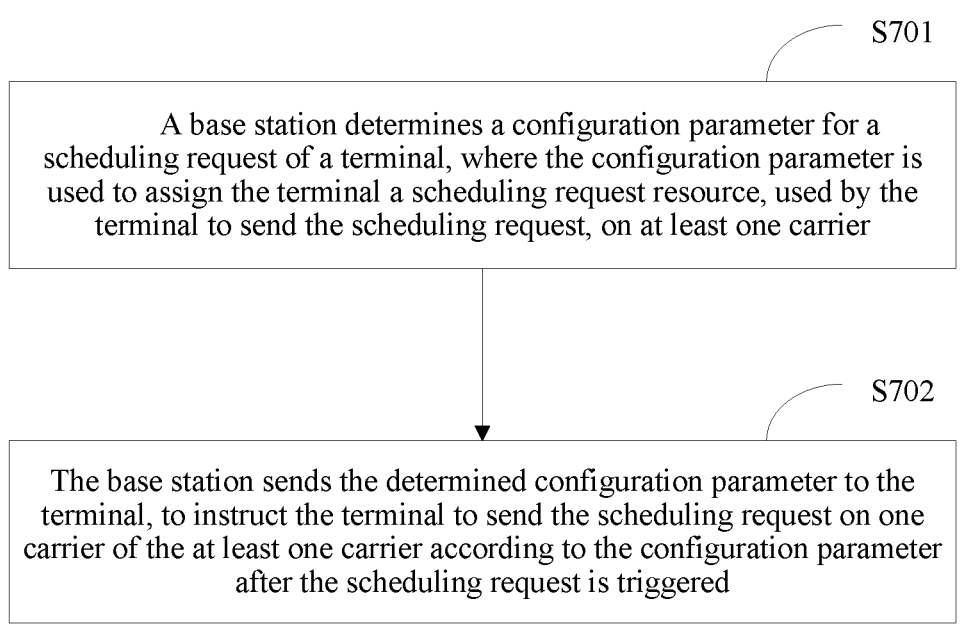
FIG. 7 is a flowchart of a scheduling request receiving method according to an embodiment of the present application.

FIG. 7 is a flowchart of a scheduling request receiving method according to an embodiment of the present application. As shown in FIG. 7, the method includes the following steps:

S701. A base station determines a configuration parameter for a scheduling request of a terminal, where the configuration parameter is used to assign the terminal a scheduling request resource, used by the terminal to send the scheduling request, on at least one carrier.

S702. The base station sends the determined configuration parameter to the terminal, to instruct the terminal to send the scheduling request on one carrier of the at least one carrier according to the configuration parameter after the scheduling request is triggered.

The at least one carrier includes at least one secondary carrier and a primary carrier; or the at least one carrier includes at least one secondary carrier.

Optionally, the configuration parameter includes a threshold of a first counter, where the threshold of the first counter is used to instruct the terminal to send the scheduling request on one carrier of the at least one carrier when the first counter is less than the threshold of the first counter; and the first counter is used to record a quantity of sending a scheduling request by the terminal in same uplink data transmission.

Optionally, the configuration parameter includes a threshold length of a first timer, where the threshold length of the first timer is used to instruct the terminal to send the scheduling request on one carrier of the at least one carrier according to the received configuration parameter when it is determined, according to the threshold length of the first timer, that the first timer times out;

the first timer is used to perform, in a same scheduling request process, timing on a time length from a current time back to a time at which the terminal sends a scheduling request last time; or perform, in a same scheduling request process, timing on a time length from a current time to a time at which the terminal can send a scheduling request next time; and the threshold length of the first timer is a minimum time interval from a time at which the terminal sends a scheduling request this time back to a time at which the terminal sends a scheduling request last time in a same scheduling request process.

Optionally, the configuration parameter includes n, a threshold length of a first timer is n times a period of a scheduling request resource available to the terminal on a specific carrier of the at least one carrier, and n is a positive integer;

n is used to instruct the terminal to determine the threshold length of the first timer according to n, and send the scheduling request on one carrier of the at least one carrier according to the received configuration parameter when it is determined, according to the determined threshold length of the first timer, that the first timer times out;

the first timer is used to perform, in a same scheduling request process, timing on a time length from a current time back to a time at which the terminal sends a scheduling request last time;

the threshold length of the first timer is a minimum time interval from a time at which the terminal sends a scheduling request this time back to a time at which the terminal sends a scheduling request last time in a same scheduling request process; and when the at least one carrier includes a primary carrier, the specific carrier is the primary carrier; or the specific carrier is a carrier, of the at least one carrier, on which the period of the scheduling request resource is minimum; or the specific carrier is a carrier, of activated carriers of the at least one carrier, on which the period of the scheduling request resource is minimum.

In conclusion, scheduling request resources are assigned to a terminal on multiple carriers by sending a configuration parameter, so that the terminal can send a scheduling request on one carrier of the multiple carriers according to the received configuration parameter. This provides a solution to effectively transmitting the scheduling request when the scheduling request resources are configured on the multiple carriers.

Figure 9A:
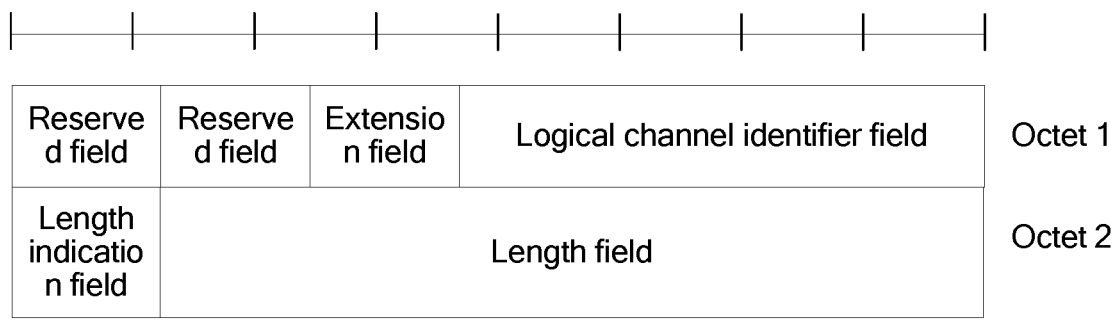
FIG. 9A is a structural diagram of header information, of a MAC PDU, whose length field is 7 bits in an existing LTE system.

In addition, in an LTE system, a format of a MAC subheader in a Media Access Control protocol data unit (MAC PDU) is shown in FIG. 9A or FIG. 9B.

An R field is a reserved bit. E is an extension bit, used to indicate whether there is another MAC subheader following the MAC subheader, where E=1 indicates that there is another MAC subheader following the MAC subheader. A logical channel identifier (LCID) field indicates that a payload part corresponding to the MAC subheader is data of which logical channel, or which Media Access Control control element (MAC CE), or a padding. A length indication field F (Flag) is used to indicate a length of a length L (length) field, where F=0 indicates that the length of the L field is 7 bits, as shown in a left figure of FIG. 8, and F=1 indicates that the length is 15 bits, as shown in a right figure of FIG. 8. The L (length) field is used to indicate a length of a Media Access Control service data unit (MAC SDU).

After more carriers are introduced to perform aggregation, such as 32 carriers and a higher-order modulation and coding scheme, a peak data transmission rate is improved greatly, for example, the data transmission rate may reach 25 Gbps. Therefore, more data is transmitted in each transmission time interval (TTI), and a length of each piece of data is longer.

However, the length of the L field is only 7 bits or 15 bits, which cannot effectively indicate a length of longer data. Therefore, the rate requirement cannot be met. That is, a longer L field is required to indicate the length of the longer data.

Embodiments of the present application resolve the problem about how to use a longer L field to effectively indicate a length of longer data. That is, in the embodiments of the present application, a new MAC subheader format and a data encapsulation and decapsulation method are designed to effectively support a higher transmission rate.

According to another aspect, an embodiment of the present application provides a data processing method, including:

receiving, by a terminal, a Media Access Control protocol data unit MAC PDU, where the MAC PDU includes header information and a Media Access Control service data unit MAC SDU, the header information includes a 5-bit logical channel identifier field, a 1-bit extension field, an N-bit length field, and a 1-bit second length indication field, where the length field is used to indicate a length of the MAC SDU, the second length indication field is used to indicate a value of the length N of the length field, and N is a positive integer;

obtaining, by the terminal, the length of the MAC SDU according to the second length indication field in the header information of the MAC PDU; and obtaining, by the terminal, the MAC SDU according to the obtained length of the MAC SDU.

With reference to the aspect, in a first possible implementation manner, the obtaining, by the terminal, the length of the MAC SDU according to the header information of the MAC PDU includes:

if the second length indication field is 1, determining, by the terminal, that the length of the length field is M bits, where M is configured by using a radio resource control (RRC) protocol message or is stipulated in a protocol, and a value of M is one of 16 bits, 17 bits, or 23 bits.

With reference to the aspect and the first possible implementation manner of the aspect, in a second possible implementation manner, the header information further includes a length indication field, where the length indication field may be a "length indication field" shown in FIG. 9A or FIG. 9B; and if the second length indication field is 0, the terminal further determines the length of the length field according to the length indication field, where if the length indication field is 0, the length of the length field is 7 bits, or if the length indication field is 1, the length of the length field is 15 bits; or if the second length indication field is 1, the terminal does not need to determine the length of the length field according to the length indication field.

With reference to any one of the first to the third possible implementation manners of the aspect, in a fourth possible implementation manner, specific formats of the header information may be the following several formats.

Format 1

As shown in FIG. 10A, the header information includes:
a 1-bit reserved field whose value is always 0;
a 1-bit second length indication field;
a 1-bit extension field, used to indicate whether there is other header information following the header information, where the other header information is used to indicate whether there is another MAC SDU and/or MAC CE following the MAC SDU;
a 5-bit logical channel identifier field, used to mark a logical channel to which the MAC SDU belongs;
a 1-bit length indication field; and
a 23-bit length field.

Format 2

Figure 10B:
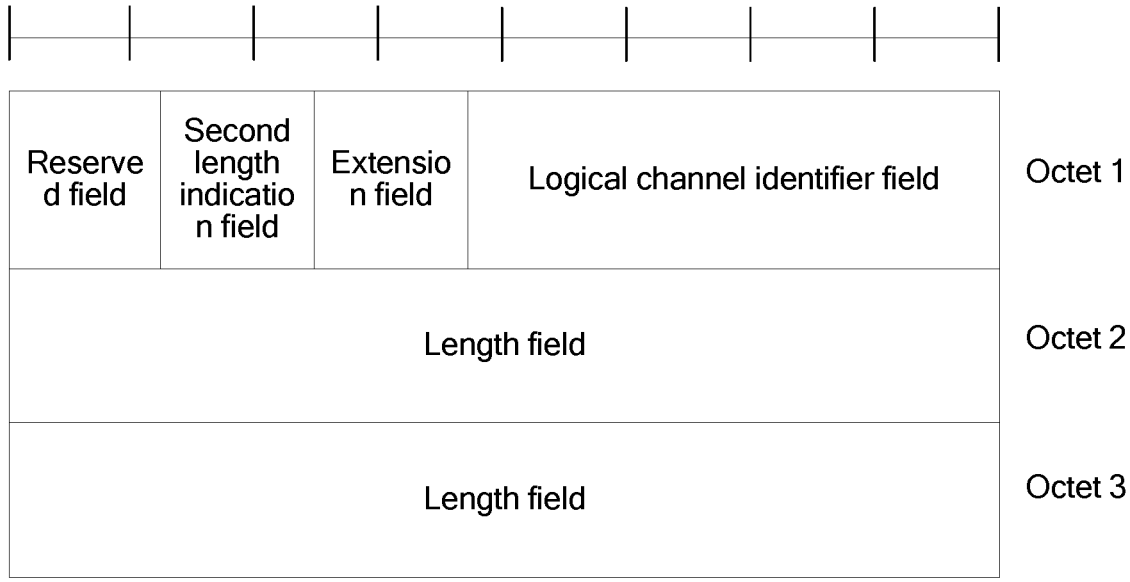
FIG. 10B is a structural diagram of header information, of a MAC PDU, whose length field is 16 bits according to an embodiment of the present application.

As shown in FIG. 10B, the header information includes:
a 1-bit reserved field whose value is always 0;
a 1-bit second length indication field;
a 1-bit extension field, used to indicate whether there is other header information following the header information, where the other header information is used to indicate whether there is another MAC SDU and/or MAC CE following the MAC SDU;
a 5-bit logical channel identifier field, used to mark a logical channel to which the MAC SDU belongs; and
a 16-bit length field.

Format 3

Figure 10C:
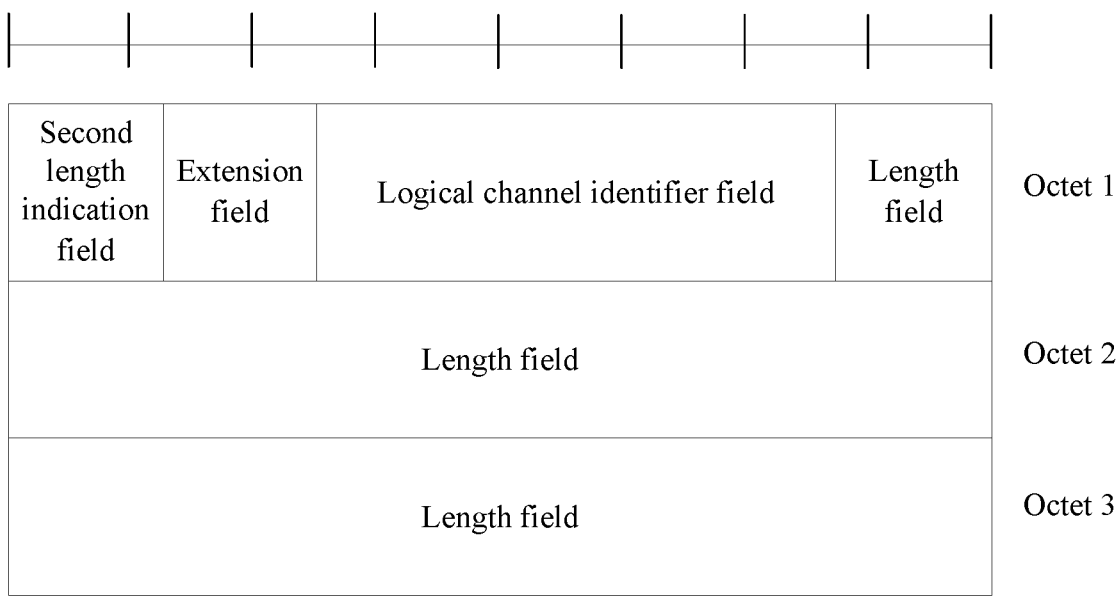
FIG. 10C is a structural diagram of header information, of a MAC PDU, whose length field is 17 bits according to an embodiment of the present application.
Figure 11:
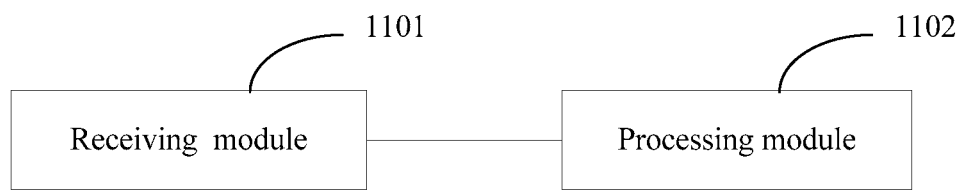
FIG. 11 is a schematic structural diagram of a receiving device according to an embodiment of the present application.
Figure 12:
FIG. 12 is a schematic structural diagram of a sending device according to an embodiment of the present application.

As shown in FIG. 10C, the header information includes:
a 1-bit second length indication field;
a 1-bit extension field, used to indicate whether there is other header information following the header information, where the other header information is used to indicate whether there is another MAC SDU and/or MAC CE following the MAC SDU;
a 5-bit logical channel identifier field, used to mark a logical channel to which the MAC SDU belongs; and
a 17-bit length field.

With reference to the first to the fourth possible implementation manners of the aspect, in a fifth possible implementation manner, before the receiving, by a terminal, a MAC PDU, the method includes:

receiving, by the terminal, a first configuration message, where the first configuration message is used to instruct the terminal to determine the length of the length field according to the second length indication field.

According to another aspect, an embodiment of the present application provides a receiving device, including:

a receiving module, configured to receive, by the device, a Media Access Control protocol data unit MAC PDU, where the MAC PDU includes header information and a Media Access Control service data unit MAC SDU, the header information includes a 5-bit logical channel identifier field, a 1-bit extension field, an N-bit length field, and a 1-bit second length indication field, where the length field is used to indicate a length of the MAC SDU, the second length indication field is used to indicate a value of the length N of the length field, and N is a positive integer; and a processing module, configured to obtain, by the device, the length of the MAC SDU according to the second length indication field in the header information of the MAC PDU, where the receiving device obtains the MAC SDU according to the obtained length of the MAC SDU.

Refer to the description in each implementation manner of the aspect for details, and details are not described herein.

According to another aspect, an embodiment of the present application provides a sending device, including:

a processing module 1201, configured to process a MAC PDU, for example, select a specific length of an L field according to a size of a MAC SDU to be included in the MAC PDU, and assemble header information of the MAC PDU and the MAC PDU according to the length of the L field, where the header information includes values of an F field, an F2 field, and the L field; and a sending module 1202, configured to send the MAC PDU.

Refer to the description in each implementation manner of the aspect for details, and details are not described herein.

Figure 8:
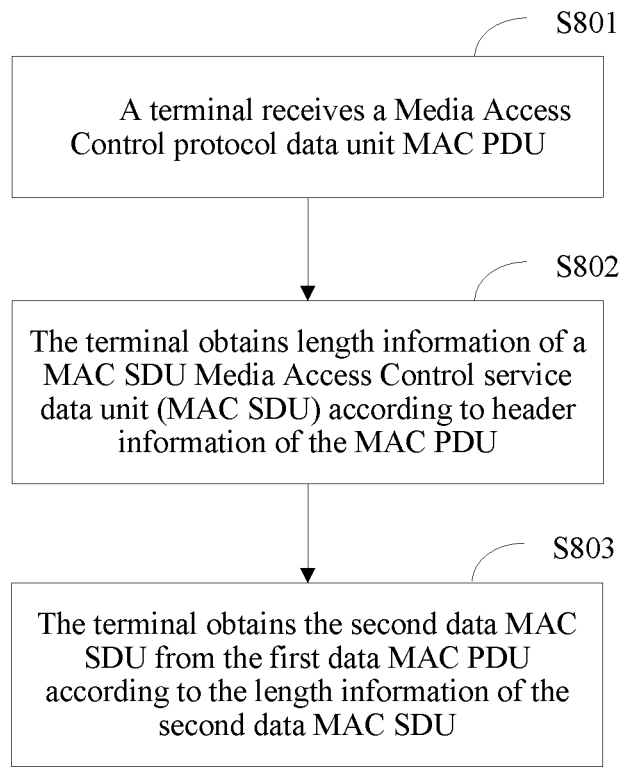
FIG. 8 is a flowchart of a data processing method according to an embodiment of the present application.

In FIG. 8, an embodiment of the present application provides a data processing method, including the following steps.

S8001. A terminal receives a Media Access Control protocol data unit (MAC PDU).

Generally, a network side device such as a base station or an evolved NodeB sends the MAC PDU to the terminal such as UE; or another terminal may send the MAC PDU to the terminal. This is not limited in the present application.

S802. The terminal obtains a length of a MAC SDU Media Access Control service data unit (MAC SDU) according to header information of the MAC PDU.

The MAC SDU may be data of a logical channel.

Specifically, as shown in the following figure, the header information of the MAC PDU includes:

a 1-bit second length indication field (F2), used to indicate a length of an L field;

an E field, an extension indication bit, used to indicate whether there is another MAC subheader following the MAC subheader, where E=1 indicates that there is another MAC subheader following the MAC subheader;

a 5-bit LCID field, used to indicate that a payload part corresponding to the MAC subheader is data of which logical channel, or which MAC CE, or a padding;

the L field, a length field, used to indicate a length of the MAC SDU, where bits occupied by the L field are obtained according to an F field;

the F field (optional), that is, a length indication field, where the F field is also used to indicate the length of the L field and occupies one bit; and a 1-bit R field (optional), which is a reserved bit.

When a value of the F2 field is 0, the UE obtains, according to an existing MAC subheader format, the length of the L field that indicates the length of the MAC SDU, that is, the UE obtains the length of the L field according to a value of the F field in the existing MAC subheader format. For example, F=0 indicates that the length of the F field is 7 bits, as shown in FIG. 9A; and F=1 indicates that the length is 15 bits, as shown in FIG. 9B.

When the value of the F2 field is 1, the UE obtains the length of the L field that indicates the length of the MAC SDU according to a new MAC subheader format.

Specifically, the length of the L field may be 23 bits, 16 bits, or 17 bits.

Optionally, before step 801, the terminal receives an RRC message, where the RRC message carries the value of the length of the L field.

Alternatively, the value of the length of the L field may be fixed in a protocol. This is not limited in this embodiment of the present application.

Further, optionally, before step 801, the terminal receives an RRC message, where the RRC message carries a configuration message that is used to instruct the terminal to determine the length of the length field according to the second length indication field, or a configuration message that is used to instruct the terminal to enable the second length indication field, or a configuration message that is used to instruct the terminal to enable a length field that is greater than 15 bits. The terminal may learn, according to the configuration message, that the length of the L field may be 23 bits, 16 bits, or 17 bits.

Optionally, if the length of the L field is 23 bits, when the value of the F2 field is 1, the UE ignores the value of the F field, that is, the terminal does not need to determine the length of the length field according to the length indication field. Therefore, the UE will not incorrectly determine the length of the L field because of the value of the F field, or the F field is equivalent to the R field.

After obtaining the length of the L field, the terminal further obtains the length of the MAC SDU according to the value of the L field.

S803. The terminal obtains the MAC SDU from the MAC PDU according to the length of the MAC SDU.

In this embodiment of the present application, a length of an extended L field can be effectively indicated by properly using the R field in the prior art, thereby ensuring normal communication of UE.

When the L field is 16 bits, an original 15-bit L field and an original F field are effectively used and combined into a new extended L field. Unnecessary protocol header overhead due to an increase of a new bit or byte is further reduced while the length of the extended L field is effectively indicated. A header information format is specifically shown in FIG. 10B.

When the L field is 17 bits, the original 15-bit L field and the original F field and R field are effectively used and combined into a new extended L field. Unnecessary protocol header overhead due to an increase of a new bit or byte is further reduced while the length of the extended L field is effectively indicated. A header information format is specifically shown in FIG. 10C.

It may be understood that, the terminal in the aspect may be replaced with the network side device such as a base station. That is, when the base station receives the MAC PDU, each implementation method of the aspect may be used, and details are not described herein.

It may be understood that, the header information of the MAC PDU and the processing method are also applicable to a data sending process of the terminal. The data sending process is reverse to a reception process. In this case, the terminal selects the specific length of the L field according to a size of a MAC SDU to be included in the MAC PDU; and assembles the header information of the MAC PDU and the MAC PDU according to the length of the L field, where the header information includes values of the F field, the F2 field, and the L field. After the base station receives the MAC PDU sent by the terminal, a processing method is the same as a method used when the terminal receives the MAC PDU, and details are not described herein.

It may be understood that, the terminal in the aspect may be replaced with the network side device such as a base station. That is, when the base station sends the MAC PDU, each implementation method of the aspect may be used, and details are not described herein.

In addition, an embodiment of the present application provides a receiving device, where the receiving device includes:

a receiving module 1101, configured to receive a MAC PDU.

Generally, a network side device such as a base station or an evolved NodeB sends the MAC PDU to UE; or another terminal may send the MAC PDU to the terminal. This is not limited in the present application.

Optionally, the device further includes a processing module 1102, configured to process the MAC PDU, for example, obtain a length of a MAC SDU Media Access Control service data unit (MAC SDU) according to header information of the MAC PDU.

The specific header information of the MAC PDU is described above, and a specific processing method is described above.

Optionally, the processing module is further configured to obtain the MAC SDU from the MAC PDU according to the length of the MAC SDU.

A specific processing method is described above.

It may be understood that the receiving device may be a terminal or may be a network side device such as a base station; and details are not described herein.

In addition, an embodiment of the present application provides a sending device, where the sending device includes:

a processing module 1201, configured to process a MAC PDU, for example, select a specific length of an L field according to a size of a MAC SDU to be included in the MAC PDU, and assemble header information of the MAC PDU and the MAC PDU according to the length of the L field, where the header information includes values of an F field, an F2 field, and the L field.

Optionally, the sending device further includes a sending module 1202, configured to send the MAC PDU.

It may be understood that the sending device may be a terminal or may be a network side device such as a base station; and details are not described herein.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the scope of the present application. The present application is intended to cover these modifications and variations provided that they fall within the scope of protection defined by the following claims and their equivalent technologies.

What is claimed is:

1. An apparatus comprising:
   a receiving circuit configured to receive, from a network side device, a configuration parameter for a scheduling request, wherein the configuration parameter assigns scheduling request resources on at least two carriers, wherein the scheduling request requests an uplink resource for a transmission of uplink data from the network side device;
   a processing circuit configured to select one carrier from the at least two carriers; and
   a sending circuit configured to send according to the configuration parameter the scheduling request on a scheduling request resource on the selected carrier of the at least two carriers when the scheduling request is triggered,
   wherein the at least two carriers comprise at least one secondary carrier and a primary carrier, or the at least two carriers comprise at least two secondary carriers,
   wherein the configuration parameter comprises a positive integer n related to a threshold length of a first timer,
   wherein the threshold length of the first timer is n times a periodicity of a scheduling request resource on a specific carrier of the at least two carriers, the periodicity of the scheduling request resource on the specific carrier being a minimum among periodicities of the scheduling request resources on the at least two carriers,
   wherein the processing circuit is further configured to:
      start the first timer according to the threshold length of the first timer after the scheduling request is sent,
      determine a length of a media access control (MAC) service data unit (SDU) in a MAC protocol data unit (PDU), wherein the MAC PDU comprises header information, and wherein the header information comprises a length field (L) indicating the length of the MAC SDU and a 1-bit second length indication field (F2),
      determine that the second length indication field (F2) indicates 1 when the apparatus determines the length of the length field (L) is 16 bits, 17 bits or 23 bits according to the length of the MAC SDU,
      determine that the second length indication field (F2) indicates 0 and that the header information further comprises a length indication field (F) indicating 0 when the apparatus determines that the length of the length field (L) is 7 bits according to the length of the MAC SDU,
      determine that the second length indication field (F2) indicates 0 and that the header information further comprises the length indication field (F) indicating 1 when the apparatus determines that the length of the length field (L) is 15 bits according to the length of the MAC SDU, and
   wherein the sending circuit is further configured to send the uplink data including the MAC PDU.

2. The apparatus according to claim 1, wherein the scheduling request resource on the selected carrier is a valid scheduling request resource on the selected carrier in a current transmission time interval (TTI), and wherein the selected carrier satisfies at least one of following conditions: the selected carrier is activated or a timer of a timing advance group (TAG) in which the selected carrier is located, does not time out.

3. The apparatus according to claim 1,
   wherein the configuration parameter comprises a threshold of a first counter and the first counter is configured to record a quantity of sending the scheduling request in the same scheduling request process, and
   wherein the sending circuit is configured to send the scheduling request on the scheduling request resource on the selected carrier of the at least two carriers when the first counter is less than the threshold of the first counter and increase a value of the first counter by one.

4. The apparatus according to claim 1,
   wherein the configuration parameter comprises a threshold of a first counter and the first counter is configured to record a quantity of sending the scheduling request in the same scheduling request process, and
   wherein the processing circuit is further configured to release physical uplink control channel resources and/or uplink reference signal resources of all serving carriers when the first counter is not less than the threshold of the first counter.

5. The apparatus according to claim 4,
wherein the at least two carriers comprise the at least two secondary carriers, and
wherein the processing circuit is configured to release the physical uplink control channel resources and/or the uplink reference signal resources of all the secondary carriers.

6. A scheduling request sending method comprising:
receiving, by a terminal from a network side device, a configuration parameter for a scheduling request, wherein the configuration parameter assigns scheduling request resources for sending the scheduling request on at least two carriers, and wherein the scheduling request requests an uplink resource for a transmission of uplink data from the network side device;
selecting, by the terminal, one carrier from the at least two carriers;
sending, by the terminal, according to the configuration parameter the scheduling request on a scheduling request resource on the selected carrier of the at least two carriers when the scheduling request is triggered, wherein the at least two carriers comprise at least one secondary carrier and a primary carrier, or the at least two carrier comprise at least two secondary carriers, wherein the configuration parameter comprises a positive integer n related to a threshold length of a first timer, and wherein the threshold length of the first timer is n times a periodicity of a scheduling request resource on a specific carrier of the at least two carriers, the periodicity of the scheduling request resource on the specific carrier being a minimum among periodicities of the scheduling request resources on the at least two carriers;
starting the first timer according to the threshold length of the first timer after the scheduling request is sent.
determining a length of a media access control (MAC) service data unit (SDU) in a MAC protocol data unit (PDU), wherein the MAC PDU comprises header information, and wherein the header information comprises a length field (L) indicating the length of the MAC SDU and a 1-bit second length indication field (F2);
determining that the second length indication field (F2) indicates 1 when the terminal determines that the length of the length field (L) is 16 bits, 17 bits or 23 bits according to the length of the MAC SDU;
determining that the second length indication field (F2) indicates 0 and that the header information further comprises a length indication field (F) indicating 0 when the terminal determines that the length of the length field (L) is 7 bits according to the length of the MAC SDU;
determining that the second length indication field (F2) indicates 0 and that the header information further comprises the length indication field (F) indicating 1 when the terminal determines that the length of the length field (L) is 15 bits according to the length of the MAC SDU; and
sending the uplink data including the MAC PDU.

7. The method according to claim 6, wherein the scheduling request resource on the selected carrier is a valid scheduling request resource on the selected carrier in a current transmission time interval (TTI), and wherein the selected carrier satisfies at least one of following conditions: the selected carrier is activated or a timer of a timing advance group (TAG) in which the selected carrier is located, does not time out.

8. The method according to claim 6,
wherein the configuration parameter comprises a threshold of a first counter, and the first counter is configured to record a quantity of sending the scheduling request in the same scheduling request process, and
wherein sending the scheduling request comprises sending the scheduling request on the scheduling request resource on the selected carrier of the at least two carriers when the first counter is less than the threshold of the first counter and increasing a value of the first counter by one.

9. The method according to claim 6,
wherein the configuration parameter comprises a threshold of a first counter, and the first counter is configured to record a quantity of sending the scheduling request in the same scheduling request process, and
wherein the method further comprises releasing physical uplink control channel resources and/or uplink reference signal resources of all serving carriers when the first counter is not less than the threshold of the first counter.

10. The method according to claim 9,
wherein the at least two carriers comprises the at least two secondary carriers, and
wherein releasing comprises releasing the physical uplink control channel resources and/or the uplink reference signal resources of all the secondary carriers.

11. An apparatus comprising:
a processing circuit configured to determine a configuration parameter for a scheduling request, wherein the configuration parameter assigns scheduling request resources on at least two carriers, and wherein the scheduling request requests an uplink resource for a transmission of uplink data from the apparatus;
a sending circuit coupled with the processing circuit,
wherein the sending circuit is configured to send the configuration parameter to a terminal,
wherein the configuration parameter is used by the terminal to send the scheduling request on a scheduling request resource on one carrier selected by the terminal from the at least two carriers when the scheduling request is triggered,
wherein the at least two carriers comprises at least one secondary carrier and a primary carrier, or the at least two carriers comprises at least one secondary carrier,
wherein the configuration parameter comprises a positive integer n related to a threshold length of a first timer, and
wherein the threshold length of the first timer is n times a periodicity of a scheduling request resource on a specific carrier of the at least two carriers, the periodicity of the scheduling request resource on the specific carrier being a minimum among periodicities of the scheduling request resources on the at least two carriers: and
a receiving circuit configured to receive from the terminal the uplink data comprising a media access control (MAC) protocol data unit (PDU), wherein the MAC PDU comprises header information and a MAC service data unit (SDU), and wherein the header information comprises a length field (L) indicating a length of the MAC SDU and a 1-bit second length indication field (F2);

wherein the processing circuit is further configured to:
  determine that a length of the length field (L) is 16 bits, 17 bits or 23 bits when the second length indication field (F2) indicates 1;
  determine that the length of the length field (L) is 7 bits when the second length indication field (F2) indicates 0 and when the header information further comprises a length indication field (F) indicating 0;
  determine that the length of the length field (L) is 15 bits when the second length indication field (F2) indicates 0 and when the header information further comprises the length indication field (F) indicating 1;
  determine the length of the MAC SDU according to the length of the length field (L); and
  determine the MAC SDU according to the length of the MAC SDU.

12. The apparatus according to claim 11, wherein the configuration parameter comprises a threshold of a first counter, and wherein the first counter is configured to record a quantity of sending the scheduling request in the same scheduling request process.

13. A method comprising:
  determining, by a network side device, a configuration parameter for a scheduling request, wherein the configuration parameter assigns scheduling request resources on at least two carriers, and wherein the scheduling request requests an uplink resource for a transmission of uplink data from the network side device;
  sending, by the network side device, the configuration parameter to a terminal,
  wherein the configuration parameter is used by the terminal to send the scheduling request on a scheduling request resource on one carrier selected by the terminal from the at least two carriers when the scheduling request is triggered,
  wherein the at least two carriers comprises at least one secondary carrier and a primary carrier, or the at least two carriers comprises at least one secondary carrier,
  wherein the configuration parameter comprises a positive integer n related to a threshold length of a first timer, and
  wherein the threshold length of the first timer is n times a periodicity of a scheduling request resource on a specific carrier of the at least two carriers, the periodicity of the scheduling request resource on the specific carrier being a minimum among periodicities of the scheduling request resources on the at least two carriers;
  receiving, by the network side device from the terminal, the uplink data comprising a media access control (MAC) protocol data unit (PDU), wherein the MAC PDU comprises header information and a MAC service data unit (SDU), and wherein the header information comprises a length field (L) indicating a length of the MAC SDU and a 1-bit second length indication field (F2);
  determining that a length of the length field (L) is 16 bits, 17 bits or 23 bits when the second length indication field (F2) indicates 1;
  determining that the length of the length field (L) is 7 bits when the second length indication field (F2) indicates 0 and when the header information further comprises a length indication field (F) indicating 0;
  determining that the length of the length field (L) is 15 bits when the second length indication field (F2) indicates 0 and when the header information further comprises the length indication field (F) indicating 1;
  determining the length of the MAC SDU according to the length of the length field (L); and
  determining the MAC SDU according to the length of the MAC SDU.

14. The method according to claim 13, wherein the configuration parameter comprises a threshold of a first counter, and wherein the first counter is configured to record a quantity of sending the scheduling request in the same scheduling request process.

* * * * *